(12) United States Patent
Ogimoto et al.

(10) Patent No.: US 10,864,717 B2
(45) Date of Patent: Dec. 15, 2020

(54) TABLET PRINTING APPARATUS

(71) Applicant: SHIBAURA MECHATRONICS CORPORATION, Yokohama (JP)

(72) Inventors: Shinichi Ogimoto, Yokohama (JP); Ryo Ikuta, Yokohama (JP); Yutaka Okabe, Yokohama (JP); Hitoshi Aoyagi, Yokohama (JP); Hikaru Hoshino, Yokohama (JP); Azusa Hirano, Yokohama (JP); Toru Kuribayashi, Yokohama (JP); Yasutsugu Tsuruoka, Yokohama (JP); Junpei Tanaka, Yokohama (JP)

(73) Assignee: SHIBAURA MECHATRONICS CORPORATION, Yokohama (JP)

( * ) Notice: Subject to any disclaimer, the term of this patent is extended or adjusted under 35 U.S.C. 154(b) by 45 days.

(21) Appl. No.: 16/204,229

(22) Filed: Nov. 29, 2018

(65) Prior Publication Data

US 2019/0091990 A1    Mar. 28, 2019

Related U.S. Application Data

(63) Continuation of application No. PCT/JP2017/022555, filed on Jun. 19, 2017.

(30) Foreign Application Priority Data

Jun. 27, 2016 (JP) .................................. 2016-126682
Sep. 30, 2016 (JP) .................................. 2016-193898
Nov. 25, 2016 (JP) .................................. 2016-229445

(51) Int. Cl.
*B41F 17/36* (2006.01)
*B41F 23/00* (2006.01)
(Continued)

(52) U.S. Cl.
CPC ............ *B41F 17/36* (2013.01); *B41F 23/005* (2013.01); *B65G 47/1471* (2013.01); *A61J 3/007* (2013.01); *B65G 2201/027* (2013.01)

(58) Field of Classification Search
CPC .... B41F 17/36; B41F 23/005; B65G 47/1471; B65G 2201/027; B65G 15/58; A61J 3/007

See application file for complete search history.

(56) References Cited

U.S. PATENT DOCUMENTS 5,423,252 A      6/1995  Yamamoto et al.
5,695,043 A  *  12/1997  Maezuru ................ B65G 15/32
                                                              198/689.1
(Continued)

FOREIGN PATENT DOCUMENTS

JP        4-84213 U      7/1992
JP        6-143539       5/1994
(Continued)

OTHER PUBLICATIONS

International Search Report dated Sep. 19, 2017 in PCT/JP2017/022555, filed on Jun. 19, 2017.

*Primary Examiner* — Leslie J Evanisko
(74) *Attorney, Agent, or Firm* — Oblon, McClelland, Maier & Neustadt, L.L.P.

(57) ABSTRACT

According to one embodiment, a tablet printing apparatus includes: a first rotator having an inner space; a duct configured to communicate with the inner space of the first rotator; a suction pipe configured to suck inside the duct; a second rotator arranged to face the first rotator across the duct; a conveyor belt wrapped around the first rotator and the second rotator; and a print head that performs printing on a tablet held on the conveyor belt. The conveyor belt includes a plurality of suction holes which communicate with the inner space of the first rotator and that of the duct, and are (Continued)

arranged in the rotation direction of the first rotator. The first rotator and the duct constitutes a suction chamber that applies a suction force to those of the suction holes of the conveyor belt located around the outer periphery of the first rotator and the duct.

19 Claims, 18 Drawing Sheets

(51) Int. Cl.
*B65G 47/14* (2006.01)
*A61J 3/00* (2006.01)

(56) References Cited

U.S. PATENT DOCUMENTS 5,996,768 A 12/1999 Boyce et al.
8,371,216 B2 * 2/2013 Chisholm .................. B41J 3/60
101/35

FOREIGN PATENT DOCUMENTS

| JP | 6-183552 | 7/1994 |
| JP | 9-118414 | 5/1997 |
| JP | 2012-153048 A | 8/2012 |
| JP | 2013-013711 A | 1/2013 |
| JP | 2015-204851 | 11/2015 |

\* cited by examiner

|  | COMMON SUCTION CHAMBER (PULLEY DOES NOT CONSTITUTE PART OF SUCTION CHAMBER) | SUCTION CHAMBER OF EMBODIMENT (PULLEY CONSTITUTES PART OF SUCTION CHAMBER) |
|---|---|---|
| MOTOR LOAD FACTOR | 98% | 37% |
| CHAMBER PRESSURE | −1.9kPa | −1.9kPa |
| VIBRATION | LARGE | SMALL |
| BLUR (PRINTING DEFECT) | × | ○ |

TABLET PRINTING APPARATUS

CROSS-REFERENCE TO THE RELATED APPLICATION

This application is based upon and claims the benefit of priority from International Application No. PCT/JP2017/022555, filed on Jun. 19, 2017; Japanese Patent Applications No. 2016-126682, filed on Jun. 27, 2016, No. 2016-193898, filed on Sep. 30, 2016 and No. 2016-229445, filed on Nov. 25, 2016; the entire contents of all of which are incorporated herein by reference.

FIELD

Embodiments described herein relate generally to a tablet printing apparatus.

BACKGROUND

Generally, a tablet printing apparatus is used to print identification information such as letters or characters (alphabet, kana character, number, etc.) and marks (symbol, figure, etc.) on the surface of a tablet to identify the tablet. As such tablet printing apparatuses, those that perform printing on tablets being conveyed with a transfer drum or inkjet system have been developed. An inkjet tablet printing apparatus is configured to eject ink (for example, edible ink) toward tablets while conveying them by a conveyor belt, thereby printing identification information on the surfaces of the tablets.

Some of the tablet printing apparatuses are provided with a tablet conveying device that conveys tablets while holding them on a conveyor belt by suction force. The conveyor belt has a plurality of suction holes, which are aligned in the conveying direction of the tablets, for sucking the tablets. Further, there is provided a suction chamber that has a suction slit over the entire circumference and faces a surface (back surface) of the conveyor belt opposite to the surface where tablets are held. Tablets are held on the conveyor belt by suction force applied via the suction holes of the conveyor belt and the suction slit of the suction chamber.

While the conveyor belt moves for conveying tablets, the suction chamber is fixedly arranged in the apparatus. Accordingly, the back surface of the conveyor belt moves in contact with the suction chamber. The suction force that the suction chamber applies to the suction holes also acts as a force to attract the back surface of the conveyor belt to the suction chamber side, which increases the contact force between the back surface of the conveyor belt and the suction chamber. If the friction force increases between the suction chamber and the conveyor belt with the increase in contact force, the conveyor belt may not move smoothly and vibrate. As a result, the tablets on the conveyor belt shake and the print quality is reduced (for example, printing misalignment or blurring may occur).

DETAILED DESCRIPTION

According to one embodiment, a tablet printing apparatus includes: a first rotator having an inner space; a duct configured to communicate with the inner space of the first rotator; a suction pipe configured to suck inside the duct; a second rotator arranged to face the first rotator across the duct; a conveyor belt wrapped around the first rotator and the second rotator; and a print head configured to perform printing on a tablet that is held on the conveyor belt. The conveyor belt includes a plurality of suction holes which communicate with the inner space of the first rotator and that of the duct, and are arranged in the rotation direction of the first rotator. The first rotator and the duct constitutes a suction chamber that applies a suction force to those of the suction holes of the conveyor belt that are located around the outer periphery of the first rotator and the duct.

First Embodiment

A first embodiment will be described with reference to FIGS. 1 to 6.

(Basic Configuration)

Figure 1:
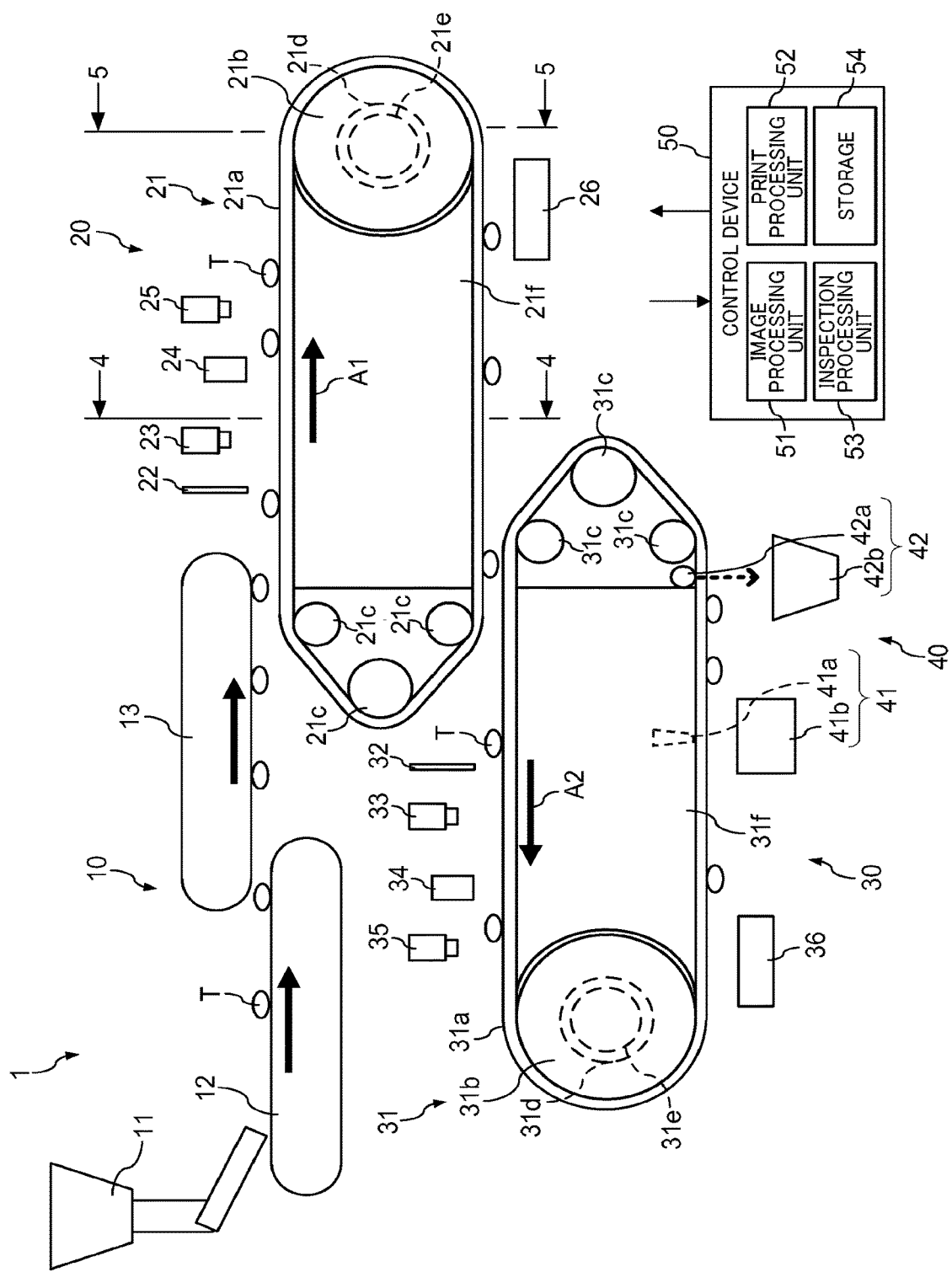
FIG. 1 is a diagram illustrating the schematic configuration of a tablet printing apparatus according to a first embodiment.

As illustrated in FIG. 1, a tablet printing apparatus 1 of the first embodiment includes a supply device (supplier) 10, a first printing device (printer) 20, a second printing device (printer) 30, a collecting device (collector) 40, and a control device (controller) 50. The first printing device 20 and the second printing device 30 basically have the same structure.

The supply device 10 includes a hopper 11, an alignment feeder 12, and a transfer feeder 13. The supply device 10 is configured to be capable of supplying the first printing device 20 with tablets T to be printed, and is located on one end of the first printing device 20. The hopper 11 stores a number of tablets T and sequentially supplies the tablets T to the alignment feeder 12. The alignment feeder 12 aligns the supplied tablets T in two rows and conveys them to the transfer feeder 13. The transfer feeder 13 sequentially sucks the tablets T on the alignment feeder 12 and conveys them in two rows to the first printing device 20, thereby supplying them in two rows to the first printing device 20. The supply device 10 is electrically connected to the control device 50, and is driven under the control of the control device 50. As the alignment feeder 12 and the transfer feeder 13, for example, a belt conveyor mechanism can be used.

The first printing device 20 includes a conveying device (tablet conveyor) 21, a detecting device (detector) 22, a first imaging device (imager for printing) 23, a print head device (print head) 24, a second imaging device (imager for inspection) 25, and a drying device (drier) 26.

The conveying device 21 includes a conveyor belt 21a, a pulley body (first rotator) 21b as a driving pulley, a plurality of driven pulleys (second rotators) 21c (three in the example of FIG. 1), a motor (driver) 21d, a position detector 21e, and a chamber 21f. The conveyor belt 21a is an endless belt, and wrapped around the pulley body 21b and each of the driven pulleys 21c. The pulley body 21b and the driven pulleys 21c are rotatably provided to the apparatus main body, and the pulley body 21b is connected to the motor 21d. The motor 21d is electrically connected to the control device 50, and is driven under the control of the control device 50. The position detector 21e is a device such as an encoder and is attached to the motor 21d. The position detector 21e is electrically connected to the control device 50, and sends a detection signal to the control device 50. The control device 50 can obtain information such as the position, speed, and movement amount of the conveyor belt 21a based on the detection signal. In the conveying device 21, the conveyor belt 21a is rotated together with the driven pulleys 21c due to the rotation of the pulley body 21b caused by the motor 21d, and the tablets T on the conveyor belt 21a are conveyed in the direction of arrow A1 in FIGS. 1 and 2 (conveying direction A1).

Figure 2:
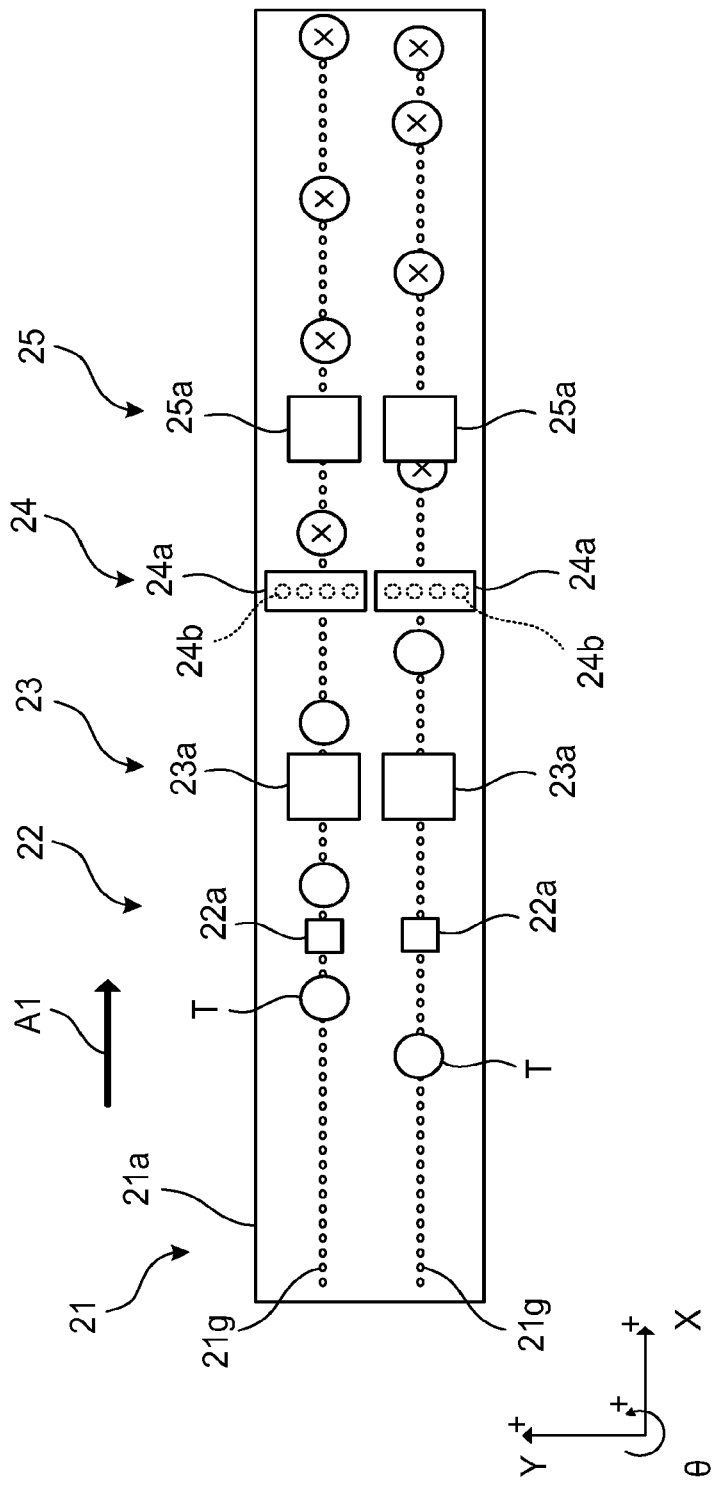
FIG. 2 is a plan view of a conveying device of the first embodiment.

As illustrated in FIG. 2, a plurality of circular suction holes 21g are formed on the surface of the conveyor belt 21a. The suction holes 21g are through holes for sucking and holding the tablets T, and are arranged in two rows in parallel along the conveying direction A1 so as to form two conveying paths. Each of the suction holes 219 is connected to the chamber 21f to obtain suction force from the chamber 21f. The chamber 21f is used to impart (apply) a suction force to the tablets T each placed on any of the suction holes 21g of the conveyor belt 21a (described in detail later).

The detecting device 22 includes a plurality of detectors 22a (two in the example of FIG. 2). The detectors 22a are located on the downstream side of the position where the tablet T is supplied by the supply device 10 on the conveyor belt 21a in the conveying direction A1. The detectors 22a are arranged in a direction crossing the conveying direction A1 (for example, a direction perpendicular to the conveying direction A1) in the horizontal plane, one for each conveying path of the tablets T, and located above the conveyor belt 21a. Each of the detectors 22a detects the position (the position in the conveying direction A1) of the tablet T on the conveyor belt 21a by projecting and receiving laser beams, and functions as a trigger sensor of each device located on the downstream side. As the detectors 22a, various laser sensors such as reflection laser sensors can be used. Each of the detectors 22a is electrically connected to the control device 50, and sends a detection signal to the control device 50.

The first imaging device 23 includes a plurality of imaging units (imagers) 23a (two in the example of FIG. 2). The imaging units 23a are located on the downstream side of the position where the detecting device 22 is located in the conveying direction A1. The imaging units 23a are arranged in a direction crossing the conveying direction A1 (for example, a direction perpendicular to the conveying direction A1) in the horizontal plane, one for each conveying path of the tablets T, and located above the conveyor belt 21a. Each of the imaging units 23a performs imaging at the time when the tablet T reaches just under the imaging unit 23a based on the position information of the tablet T to capture an image (image for printing) including the upper surface of the tablet T, and sends the image to the control device 50. As the imaging units 23a, various cameras having an imaging device such as a charge-coupled device (CCD) or a complementary metal-oxide semiconductor (CMOS) can be used. Each of the imaging units 23a is electrically connected to the control device 50, and is driven under the control of the control device 50. There may also be provided an illumination for imaging as necessary.

The print head device 24 includes a plurality of inkjet print heads 24a (two in the example of FIG. 2). The print heads 24a are located on the downstream side of the position where the first imaging device 23 is located in the conveying direction A1. The print heads 24a are arranged in a direction crossing the conveying direction A1 (for example, a direction perpendicular to the conveying direction A1) in the horizontal plane, one for each conveying path of the tablets T, and located above the conveyor belt 21a. Each of the print heads 24a has a plurality of nozzles 24b (see FIG. 2: only four nozzles are illustrated in the figure), and ejects ink from the nozzles 24b individually. Each of the print heads 24a is arranged such that the alignment direction of the nozzles 24b crosses (for example, perpendicularly to) the conveying direction A1 in the horizontal plane. As the print heads 24a, various inkjet print heads having a drive element such as a piezoelectric element, a heating element, a magnetostrictive element or the like can be used. Each of the print heads 24a is electrically connected to the control device 50, and is driven under the control of the control device 50.

The second imaging device 25 includes a plurality of imaging units (imagers) 25a (two in the example of FIG. 2). The imaging units 25a are located on the downstream side of the position where the print head device 24 is located in the conveying direction A1. The imaging units 25a are arranged in a direction crossing the conveying direction A1 (for example, a direction perpendicular to the conveying direction A1) in the horizontal plane, one for each conveying path of the tablets T, and located above the conveyor belt 21a. Each of the imaging units 25a performs imaging at the time when the tablet T reaches just under the imaging unit 25a based on the position information of the tablet T to capture an image (image for inspection) including the upper surface of the tablet T, and sends the image to the control device 50. Similarly to the imaging units 23a, various cameras having an imaging device such as CCD or CMOS can be used as the imaging units 25a. Each of the imaging units 25a is electrically connected to the control device 50, and is driven under the control of the control device 50. There may also be provided an illumination for imaging as necessary.

The drying device 26 is located on the downstream side of the position where the second imaging device 25 is located in the conveying direction A1, and is arranged, for example, below the conveying device 21. The drying device 26 is shared in the two conveying paths, and is configured to dry the ink applied to each of the tablets T on the conveyor belt 21a. As the drying device 26, various types of dryers such as a heater for drying an object by radiation heat, a blower for drying an object with worm air or hot air, or the like can be used. The drying device 26 is electrically connected to the control device 50, and is driven under the control of the control device 50.

The tablet T having passed above the drying device 26 is conveyed along with the movement of the conveyor belt 21a and reaches a position near the end of the conveyor belt 21a on the driven pulleys 21c side. At this position, the sucking action no longer works on the tablet T. The tablet T is released from the hold of the conveyor belt 21a, and is transferred from the first printing device 20 to the second printing device 30.

The second printing device 30 includes a conveying device (conveyor) 31, a detecting device (detector) 32, a first imaging device (imager for printing) 33, a print head device (print head) 34, a second imaging device (imager for inspection) 35, and a drying device (drier) 36. The conveying device 31 includes a conveyor belt 31a, a pulley body 31b as a driving pulley, a plurality of driven pulleys 31c (three in the example of FIG. 1), a motor (driving unit) 31d, a position detector 31e, and a chamber 31f. Each constituent element of the second printing device has basically the same structure as the corresponding constituent element of the first printing device 20 described above. Therefore, the description thereof will be omitted. In FIG. 1, arrow A2 indicates the conveying direction of the second printing device 30 (conveying direction A2).

The collecting device 40 includes a defective product collecting device (collector) 41 and a non-defective product collecting device (collector) 42. The collecting device 40 is located on the downstream side of the position where the drying device 36 of the second printing device 30 is located in the conveying direction A2. The collecting device 40 collects defective tablets T by the defective product collecting device 41 and collects non-defective (good) tablets T by the non-defective product collecting device 42.

The defective product collecting device 41 includes an injection nozzle 41a and a container 41b. The injection nozzle 41a is provided in the conveying device 31 of the second printing device 30. The injection nozzle 41a injects gas (for example, air) toward the tablet T (defective tablet T) conveyed by the conveyor belt 31a to drop the tablet T from the conveyor belt 31a. At this time, the gas injected from the injection nozzle 41a passes through suction holes (similar to the suction holes 21g illustrated in FIG. 2) of the conveyor belt 31a and hits the tablet T. The injection nozzle 41a is electrically connected to the control device 50, and is driven under the control of the control device 50. The container 41b receives and stores the tablet T dropped from the conveyor belt 31a.

The non-defective product collecting device 42 includes a gas blower 42a and a container 42b. The non-defective product collecting device 42 is located on the downstream side of the position where the defective product collecting device 41 is located in the conveying direction A2. The gas blower 42a is arranged at the end of the conveying device 31 in the conveying device 31 of the second printing device 30, i.e., at the end of the conveyor belt 31a on the driven pulleys 31c side. During the printing process, for example, the gas blower 42a constantly blows gas (for example, air) toward the conveyor belt 31a to drop the tablet T from the conveyor belt 31a. At this time, the gas blown out from the gas blower 42a passes through suction holes (similar to the suction holes 21g illustrated in FIG. 2) of the conveyor belt 31a and hits the tablet T. Examples of the gas blower 42a include an air blower having a slit-shaped opening extending in a direction crossing the conveying direction A2 (for example, a direction perpendicular to the conveying direction A2) in the horizontal plane. The gas blower 42a is electrically connected to the control device 50, and is driven under the control of the control device 50. The container 42b receives and stores the tablet T dropped from the conveyor belt 31a.

The tablet T having passed through the defective product collecting device 41 is conveyed along with the movement of the conveyor belt 31a, and reaches a position near the end of the conveyor belt 31a on the driven pulleys 31c side. At this position, the sucking action no longer works on the tablet T. With the gas blower 42a, the tablet T can be reliably collected in the container 42b from the conveyor belt 31a.

The control device 50 includes an image processing unit (image processor) 51, a print processing unit (print processer) 52, an inspection processing unit (inspection processer) 53, and a storage 54. The image processing unit 51 processes an image. The print processing unit 52 performs processing related to printing. The inspection processing unit 53 performs processing related to inspection. The storage 54 stores various information such as processing information and various programs. The control device 50 receives position information of the tablets T sent from each of the detecting devices 22 and 32 of the first printing device 20 and the second printing device 30, images sent from each of the imaging devices 23, 25, 33 and 35 of the first printing device 20 and the second printing device 30, and the like.

(Suction Chamber)

Next, the chamber 21f and the pulley body 21b of the first printing device 20 will be described with reference to FIGS. 3 to 6. The chamber 21f and the pulley body 21b constitute a suction chamber. The chamber 31f and the pulley body 31b of the second printing device 30 have basically the same structure, and therefore the description thereof will be omitted.

Figure 3:
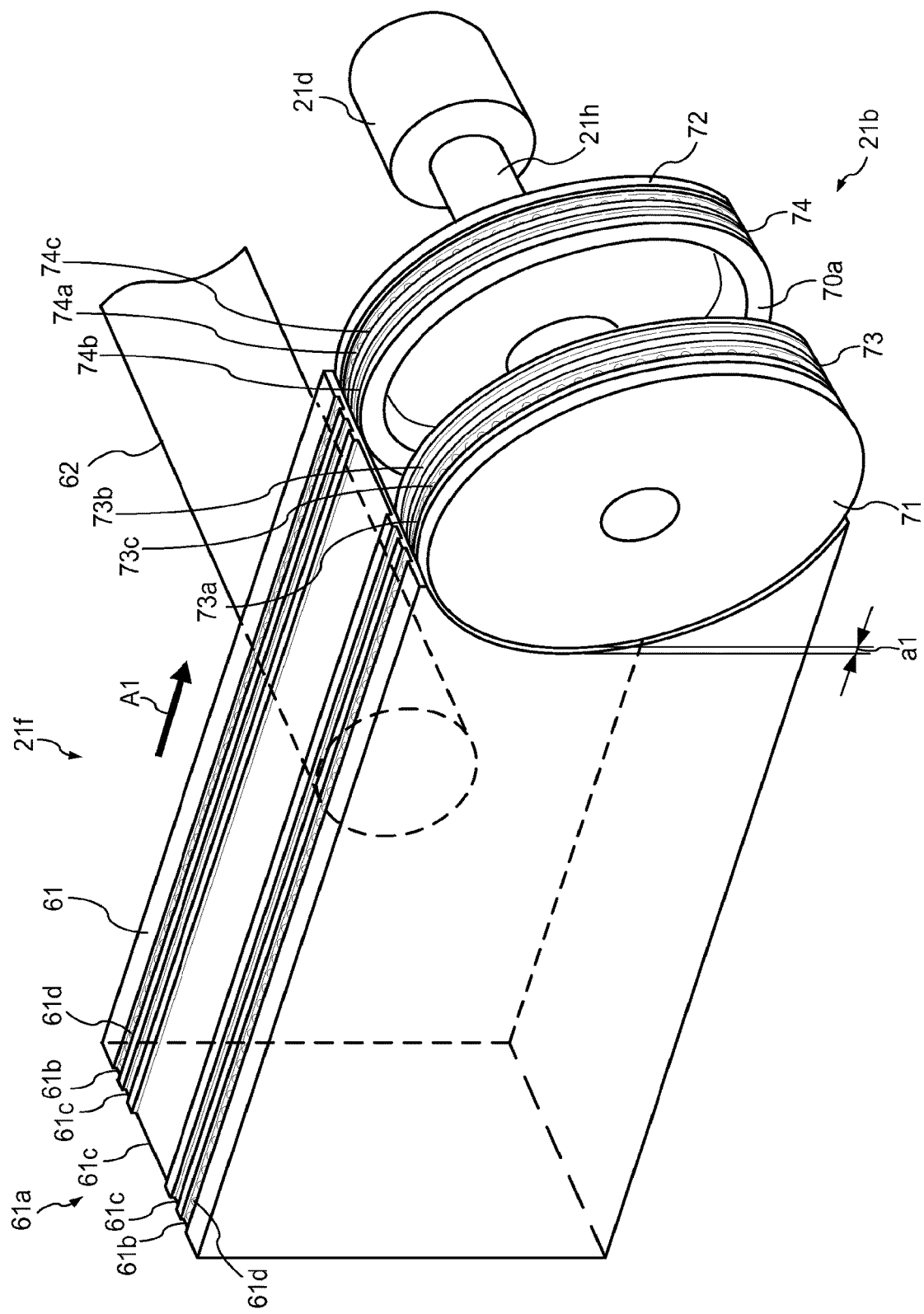
FIG. 3 is a perspective view of a chamber, a suction pipe, and a pulley of the conveying device of the first embodiment.

As illustrated in FIG. 3, the chamber 21f includes a chamber main body 61. Incidentally, the conveyor belt 21a is not illustrated in FIG. 3. The chamber main body 61 is formed in, for example, a rectangular parallelepiped housing (cuboid housing). The chamber main body 61 has an opening at the end on the pulley body 21b side. The opening is formed to fit the outer circumferential shape of the pulley body 21b. The chamber main body 61 is connected to a suction device (suction actuator: not illustrated) such as a pump through a suction pipe 62, and the inside of the chamber main body 61 is depressurized by the operation of the suction device. The suction pipe is connected to substantially the center of a side surface (a surface parallel to the conveying direction A1) of the chamber main body 61. The suction device is electrically connected to the control device 50, and is driven under the control of the control device 50.

Figure 4:
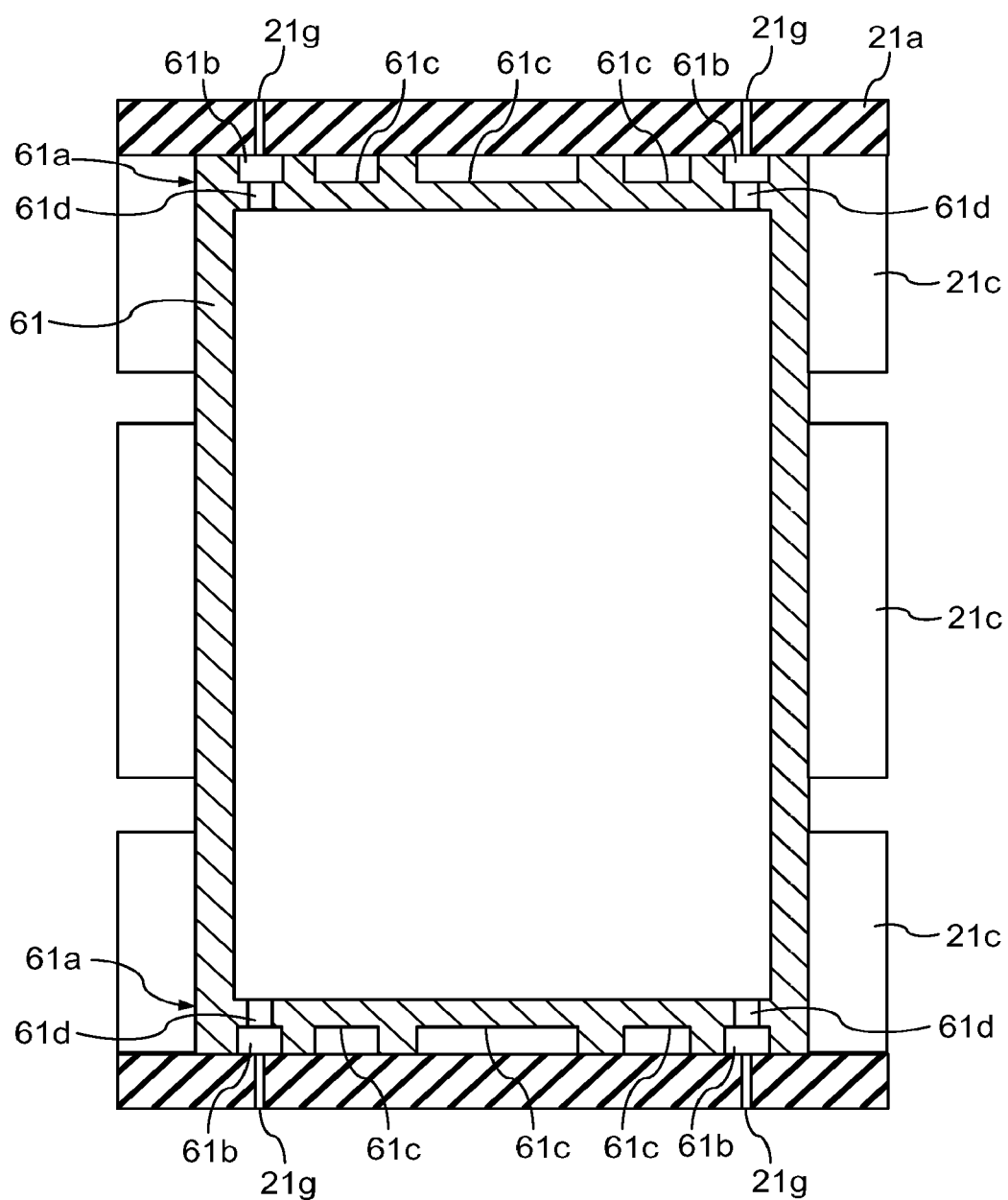
FIG. 4 is a cross-sectional view taken along line 4-4 of FIG. 1.

As illustrated in FIGS. 3 and 4, the chamber main body 61 includes a guide portion (guider) 61a. The guide portion 61a is formed on the upper surface and the lower surface of the chamber main body 61. The guide portion 61a is provided with a plurality of suction grooves 61b (two in FIGS. 3 and 4) and a plurality of grooves 61c (three in FIGS. 3 and 4) extending in the conveying direction A1 of the tablets T. The suction grooves 61b are each formed for each conveying path of the tablets T so as to be located immediately below the suction holes 21g of the conveyor belt 21a that is wrapped around the pulley body 21b and the driven pulleys 21c. The suction grooves 61b have a plurality of through holes 61d in their bottom surfaces. The through holes 61d connect to the inside of the chamber main body 61 and are aligned in the conveying direction A1 of the tablets T. Accordingly, when the inside of the chamber main body 61 is sucked, the suction force is applied to the tablets T on the suction holes 21g formed in the upper surface area and the lower surface area of the conveyor belt 21a. The grooves 61c are formed to reduce the contact area between the chamber main body 61 and the conveyor belt 21a.

Figure 5:
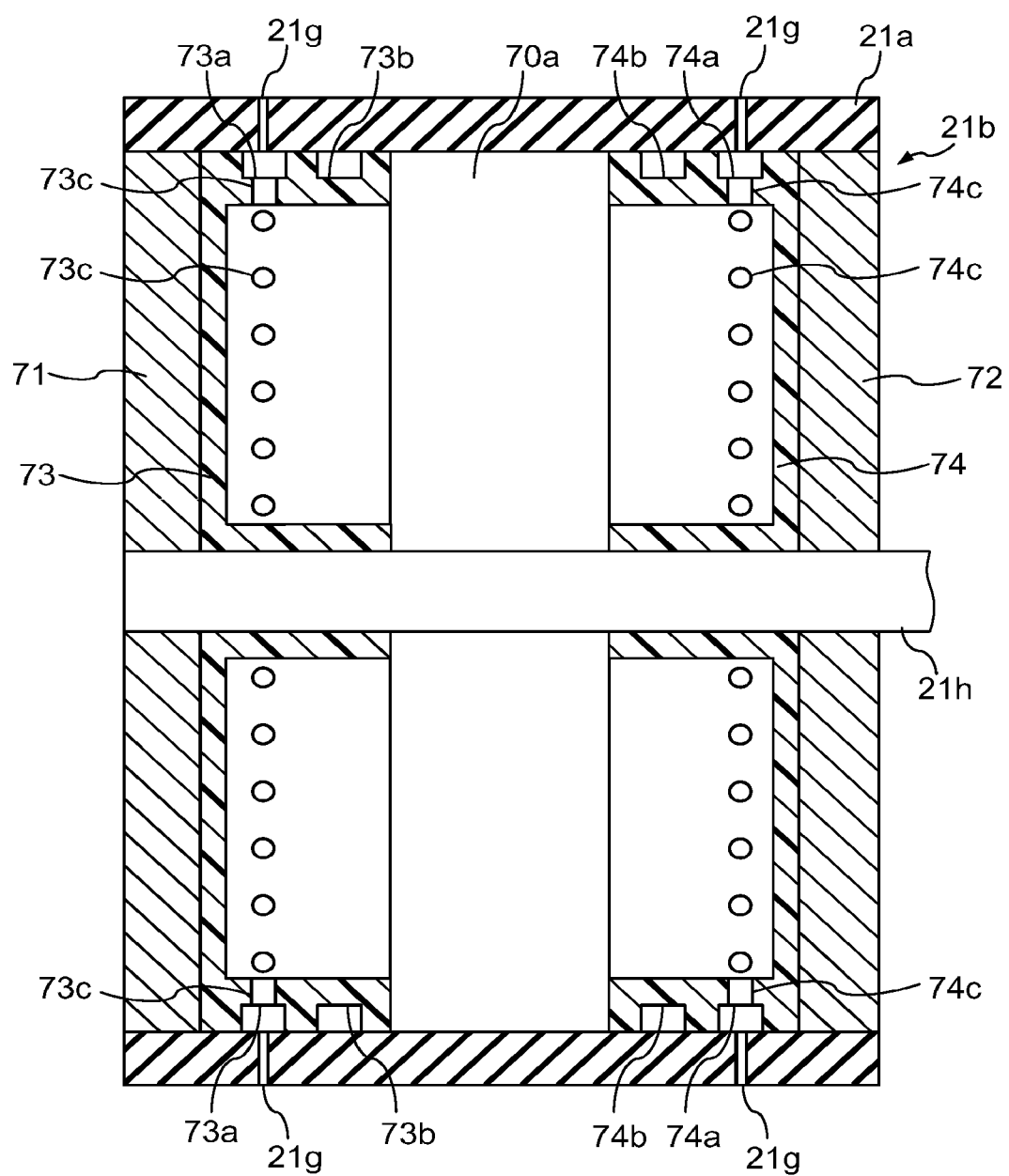
FIG. 5 is a cross-sectional view taken along line 5-5 of FIG. 1.

As illustrated in FIGS. 3 and 5, the pulley body 21b includes a pair of conveyor pulleys 71, 72 and a pair of guide pulleys 73, 74.

The conveyor pulleys 71 and 72 are located at both ends of the conveyor belt 21a in the width direction (the direction perpendicular to the conveying direction A1 in the horizontal plane) so as to be separated from each other, and are fixed to a rotating shaft 21h of the motor 21d. The conveyor pulleys 71 and 72 move the conveyor belt 21a by rotating it according to the rotation of the rotating shaft 21h of the motor 21d. When a belt with gears is used as an example of the conveyor belt 21a, gear pulleys (timing pulleys) are used as the conveyor pulleys 71 and 72.

As illustrated in FIG. 3, the separation distance (gap a1 in the conveying direction A1) between the conveyor pulley 71 and the chamber main body 61 is within a range of, for example, 0.5 mm to 1.0 mm, which is smaller than the thickness of the tablet T. This prevents the tablet T from entering the inside of the chamber main body 61 or the pulley body 21b due to some reason. If the conveyor pulley 71 is a gear pulley, the height and width of its teeth are determined so as to prevent the tablet T from entering the inside of the chamber main body 61 or the pulley body 21b. The separation distance (gap a1 in the conveying direction A1) between the conveyor pulley 72 and the chamber main body 61 is determined in the same manner as the case of the conveyor pulley 71.

The guide pulleys 73 and 74 are located between the conveyor pulleys 71 and 72 adjacently thereto, and fixed to the rotating shaft 21h of the motor 21d. Accordingly, the guide pulleys 73 and 74 rotate together with the conveyor pulleys 71 and 72 in contact with the conveyor belt 21a according to the rotation of the rotating shaft 21h of the motor 21d. In particular, the guide pulleys 73 and 74 are arranged to face each other while being spaced apart in a direction in which the rotating shaft 21h of the motor 21d extends. This provides a slit-shaped through hole 70a extending in the rotation direction of the pulley body 21b as well as a space (inner space) inside the pulley body 21b. Thereby, the pulley body 21b has the slit-shaped through hole 70a, which is a gap between the guide pulleys 73 and 74. The slit-shaped through hole 70a has a width of several centimeters to several tens of centimeters. The inner space of the chamber main body 61 and the inner space of the pulley body 21b communicate with each other through the through hole 70a. The chamber main body 61 and the suction pipe 62 function as ducts (air passages) to the pulley body 21b.

The guide pulley 73 is provided with a suction groove 73a and a groove 73b that extend over its entire outer periphery in the rotation direction of the guide pulley 73. The suction groove 73a is arranged in a position facing a row of the suction holes 21g of the conveyor belt 21a that is wrapped around the pulley body 21b. The suction groove 73a has a plurality of through holes 73c in its bottom surface. The through holes 73c are aligned over the entire outer periphery of the guide pulley 73 in the rotation direction of the guide pulley 73. The diameter of each of the through holes 73c is, for example, about several millimeters. As with the guide pulley 73, the guide pulley 74 is also provided with a suction groove 74a and a groove 74b that extend over its entire outer periphery in the rotation direction of the guide pulley 74. The suction groove 74a also has a plurality of through holes 74c in its bottom surface. The through holes 74c are aligned over the entire outer periphery of the guide pulley 74 in the rotation direction of the guide pulley 74.

Figure 6:
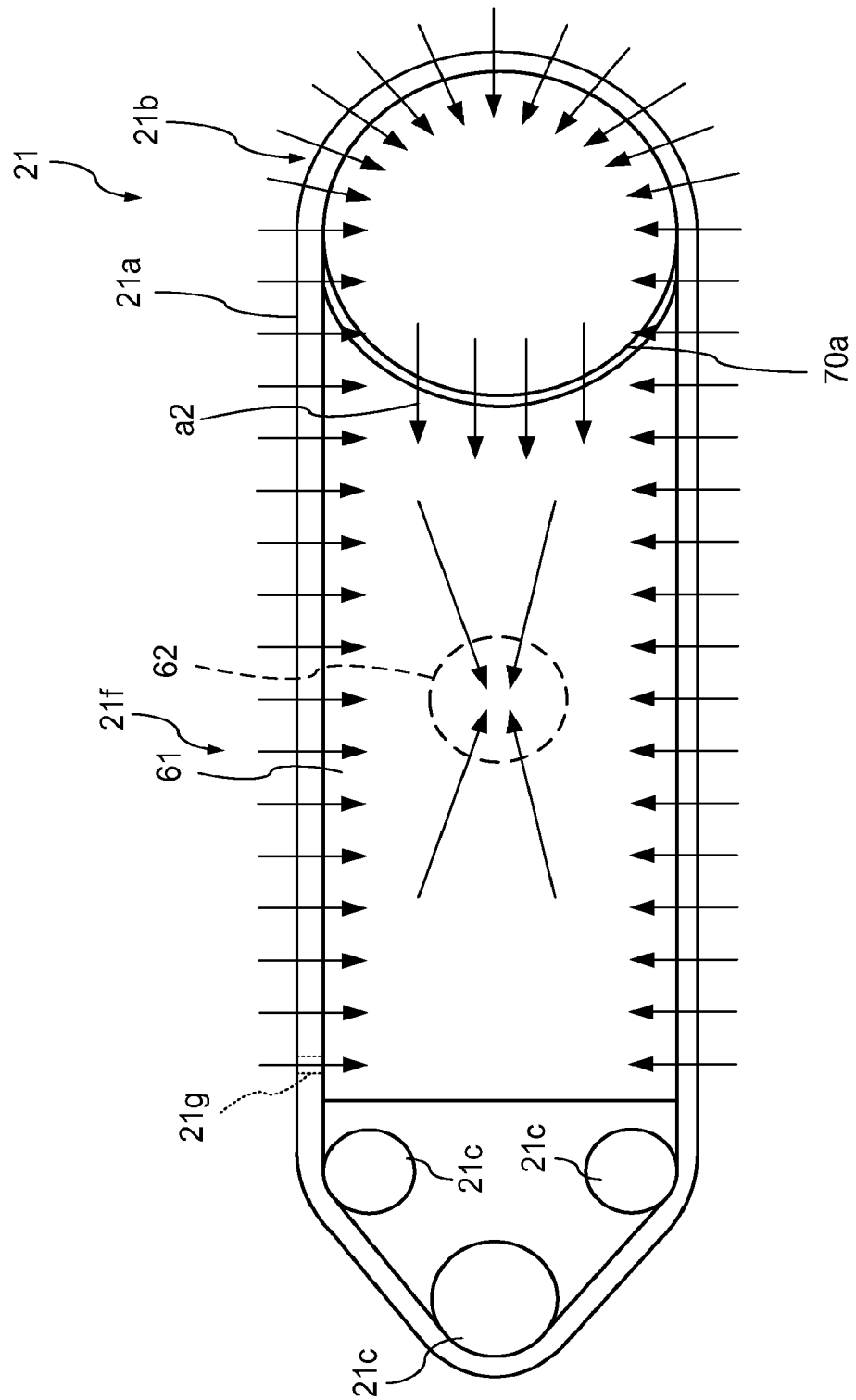
FIG. 6 is a diagram for explaining the suction state of the conveying device of the first embodiment.

As illustrated in FIG. 6 (see arrows), in response to the suction of air in the chamber main body 61 by the suction pipe 62, air is sucked from the suction holes 21g of the conveyor belt 21a located on the upper surface and the lower surface of the chamber main body 61 through the suction grooves 61b and the through holes 61d (see FIG. 4) of the chamber main body 61. With this, suction force is applied to the tablets T on the suction holes 21g of the conveyor belt 21a located on the upper surface and the lower surface of the chamber main body 61. The inner space of the chamber main body 61 and the inner space of the pulley body 21b communicate with each other through the slit-shaped through hole 70a. Therefore, when the air in the chamber main body 61 is sucked through the suction pipe 62 as described above, air is sucked from the inner space of the pulley body 21b through the slit-shaped through hole 70a by the chamber main body 61, the conveyor belt 21a is sucked through the suction groove 73a, and air is sucked from the suction holes 21g of the conveyor belt 21a located around the outer periphery of the pulley body 21b. Thereby, suction force is applied to (acts on) the tablets T on the suction holes 21g of the conveyor belt 21a located around the outer periphery of the pulley body 21b.

The above-mentioned suction force needs to be equal or larger than the self-weight of the tablets T and the centrifugal force generated during conveyance. Specifically, in the upper surface area of the conveyor belt 21a, a suction force that at least prevents the tablets T from shifting and shaking (relatively weak suction force) is required. Meanwhile, a suction force that prevents the tablets T from falling is required in the lower surface area of the conveyor belt 21a, and a suction force that counteracts against the centrifugal force is required in the area of the conveyor belt 21a rotating in the circumferential direction of the pulley body 21b. Therefore, large suction force is applied to the tablets T on the suction holes 21g of the conveyor belt 21a around the outer periphery of the pulley body 21b. Accordingly, the surface of the conveyor belt 21a in this portion may be warped due to the suction force. If the surface of the conveyor belt 21a becomes uneven due to this, it is difficult to stably convey the tablets T. To prevent this, the guide pulleys 73 and 74 are provided for supporting the conveyor belt 21a. The guide pulleys 73 and 74 may not be required if the conveyor belt 21a has a high rigidity and the surface thereof can be maintained flat (see third embodiment).

(Printing Process)

In the following, a description will be given of printing process and inspection process performed by the tablet printing apparatus 1.

First, various information such as print data required for printing is stored in the storage 54 of the control device 50. Then, when a number of tablets T to be printed are put in the hopper 11 of the supply device 10, the tablets T are sequentially supplied to the alignment feeder 12 from the hopper 11, and moved as being aligned in two rows by the alignment feeder 12. The transfer feeder 13 sequentially supplies the tablets T moving in two rows to the conveyor belt 21a. The conveyor belt 21a is rotating in the conveying direction A1 with the rotation of the pulley body 21b and the driven pulleys 21c caused by the motor 21d. Accordingly, the tablets T supplied onto the conveyor belt 21a are conveyed at a predetermined moving speed in two rows on the conveyor belt 21a. The conveyor belt 31a is also rotating in the conveying direction A2 with the rotation of the pulley body 31b and the driven pulleys 31c caused by the motor 31d.

Thereafter, the detecting device 22 detects each of the tablets T on the conveyor belt 21a. Thereby, position information (the position in the conveying direction A1) of the tablet T is acquired and fed to the control device 50. The position information of the tablet T is stored in the storage 54 and used for post-processing. Next, the first imaging device 23 captures an image of the tablet T on the conveyor belt 21a at the timing based on the position information of the tablet T, and sends the image to the control device 50. The image processing unit 51 generates position deviation information of the tablet T (for example, the position deviation of the tablet T in the X direction, the Y direction, and the 8 direction) based on each image received from the first imaging device 23. The position deviation information is stored in the storage 54. The print processing unit 52 sets printing conditions (ejection position and ejection speed of ink, etc.) for the tablet T based on the position deviation information of the tablet T. The printing conditions are stored in the storage 54.

Subsequently, the print head device 24 performs printing on each of the tablets T on the conveyor belt 21a according to the printing conditions at the timing based on the position information of the tablet T, i.e., at the timing when the tablet T reaches below the print head device 24. In each of the print heads 24a of the print head device 24, ink is appropriately ejected from each of the nozzles 24b. Thus, identification information such as a letter (for example, alphabet, kana character, number), a mark (for example, symbol, figure), or the like is printed on the upper surface of the tablet T.

The second imaging device 25 captures an image of the tablet T having the identification information printed thereon at the timing based on the position information of the tablet T, and sends the image to the control device 50. The image processing unit 51 generates print position information indicating the print position of the print pattern for each of the tablets T based on each image received from the second imaging device 25. The print position information is stored in the storage 54. The inspection processing unit 53 determines print quality as to whether the print on the tablet T is acceptable based on the print position information, and print quality determination result information indicating the result of the print quality determination is stored in the storage 54 for each tablet T. For example, it is determined whether the print pattern is printed at a predetermined position on the tablet T.

The tablet T after the inspection is conveyed with the movement of the conveyor belt 21a and passes above the drying device 26. At this time, the drying device 26 dries the ink applied to the tablet T while the tablet T is passing above the drying device 26. The tablet T having the ink dried is conveyed with the movement of the conveyor belt 21a, and arrives near the end of the conveyor belt 21a on the driven pulleys 21c side. At this position, the sucking action no longer works on the tablet T. The tablet T is released from the hold of the conveyor belt 21a, and is transferred from the first printing device 20 to the second printing device 30.

After that, the second printing device 30 also performs the printing process and the inspection process in the same manner as described above. The tablet T after the inspection is conveyed with the movement of the conveyor belt 31a and passes above the drying device 36. Then, the tablet T with the ink dried reaches the defective product collecting device 41. If the tablet T is defective, it is dropped from the conveyor belt 31a by the gas ejected from the injection nozzle 41a and collected in the container 41b. If the tablet T is non-defective, it passes through the defective product collecting device 41, and reaches the non-defective product collecting device 42. At this position, the sucking action no longer works on the tablet T, and the non-defective tablet T is dropped from the conveyor belt 31a by the gas ejected from the gas blower 42a and collected in the container 42b.

In this printing process, the air in the chamber main body 61 is sucked through the suction pipe 62, and the air in the pulley body 21b is sucked by the chamber main body 61 from the slit-shaped through hole 70a extending in the rotation direction of the pulley body 21b. Thereby, suction force is applied to the tablets T on the suction holes 21g of the conveyor belt 21a located around the outer periphery of the pulley body 21b. Thus, the pulley body 21b functions as a chamber for sucking air from the suction holes 21g of the conveyor belt 21a located around the outer periphery of the pulley body 21b. Besides, the guide pulleys 73 and 74 of the pulley body 21b rotate together with the conveyor belt 21a. That is, the guide pulleys 73 and 74 that constitute a chamber do not move with respect to the conveyor belt 21a. This eliminates the occurrence of friction which hinders the rotation of the conveyor belt 21a in the position of the pulley body 21b.

In this embodiment, the guide pulleys 73 and 74 of the pulley body 21b are configured to rotate together with the conveyor belt 21a. Thereby, it is possible to prevent the occurrence of friction which hinders the rotation of the conveyor belt 21a in at least a portion of the conveyor belt around the pulley body 21b. This reduces the load fluctuation in the driving unit such as the motor 21d, thereby suppressing the vibration of the conveyor belt 21a. Accordingly, the conveyor belt 21a can stably convey the tablets T. As a result, it is possible to prevent reduction in print quality (for example, printing misalignment, blurring, etc.), the falling of the tablets T, and the like due to the vibration of the conveyor belt 21a.

As described above, according to the first embodiment, the inner space of the chamber main body and the inner space of the pulley body 21b communicate with each other through the slit-shaped through hole 70a. When the air in the chamber main body 61 is sucked through the suction pipe 62, air is sucked from the inner space of the pulley body 21b through the slit-shaped through hole 70a by the chamber main body 61. Thereby, suction force is applied to the tablets T on the suction holes 21g of the conveyor belt 21a located around the outer periphery of the pulley body 21b. Thus, the pulley body 21b functions as a chamber for sucking air from the suction holes 219 of the conveyor belt 21a located around the outer periphery of the pulley body 21b. Besides, the guide pulleys 73 and 74 of the pulley body 21b rotate together with the conveyor belt 21a. This reduces the force against the movement of the conveyor belt 21a, and the conveyor belt 21a moves smoothly. Thereby, the vibration of the conveyor belt 21a can be suppressed. Accordingly, the conveyor belt 21a can stably convey the tablets T. Besides, the inner space of the rotating pulley body 21b and the inner space of the fixed chamber main body 61 communicate with each other through the slit-shaped through hole 70a, and there is no sliding portion between them. Thus, it is possible to prevent the generation of dust which is a major enemy of the tablet printing apparatus. In addition, since the air in the pulley body 21b can be sucked through the suction pipe 62 that is connected to the chamber main body 61, the apparatus structure can be prevented from being complicated.

Further, compared to conventional suction chambers, the pulley body 21b and the chamber main body 61 can be removed separately from the tablet printing apparatus 1. Therefore, upon cleaning the suction chamber, the pulley body 21b and the chamber main body 61 can be cleaned separately. As a result, it is possible to lighten member to be cleaned at one time. Thus, the operator can easily carry each member, which makes the cleaning easier.

As illustrated in FIG. 4, the chamber main body 61 is provided with the guide portion 61a on its upper and lower surfaces, and the grooves 61c are formed in the guide portion 61a. The conveyor belt 21a moves relative to the upper and lower surfaces of the chamber main body 61. However, the grooves 61c are formed and reduces the contact area between the chamber main body 61 and the conveyor belt 21a, thereby further reducing the load fluctuation in the driving unit caused by the movement of the conveyor belt 21a.

In the tablet printing apparatus 1, the conveyor belt 21a sequentially conveys the tablets T made by, for example, compression-molding of powders or granules. Therefore, the powders of the tablets T gradually accumulate on the conveyor belt 21a. The powders of the tablets T may enter the suction grooves 73a and 74a of the pulley body 21b, the through holes 73c and 74c of the pulley body 21b, and the like from the suction holes 21g and adhere thereto. This causes a decrease in the suction force for sucking the tablets T. However, since the outer peripheral surface of the pulley body 21b is not covered with the conveyor belt 21a on the chamber main body 61 side but exposed to the opening of the chamber main body 61, the powders of the tablets T adhering to the suction grooves 73a and 74a of the pulley body 21b and the through holes 73c and 74c of the pulley body 21b are sucked from the opening of the chamber main body 61 (see arrow a2 in FIG. 6). Thereby, the powders of the tablets T adhering to the suction grooves 73a and 74a of the pulley body 21b and the through holes 73c and 74c of the pulley body 21b can be removed, which suppresses the decrease in the suction force for sucking the tablets T due to the powders of the tablets T. Thus, the stable conveyance of the tablets T can be realized. It is also possible to reduce the frequency of maintenance works such as cleaning of the pulley body 21b, or even eliminate the need of the maintenance works. There may be provided a filter (not illustrated) in the middle of the suction pipe 62 to catch the powders of the tablets T.

Second Embodiment

A second embodiment will be described with reference to FIGS. 7 and 8. In the second embodiment, the difference (the configuration of the pulley body) from the first embodiment will be described, and the same description will not be repeated.

Figure 7:
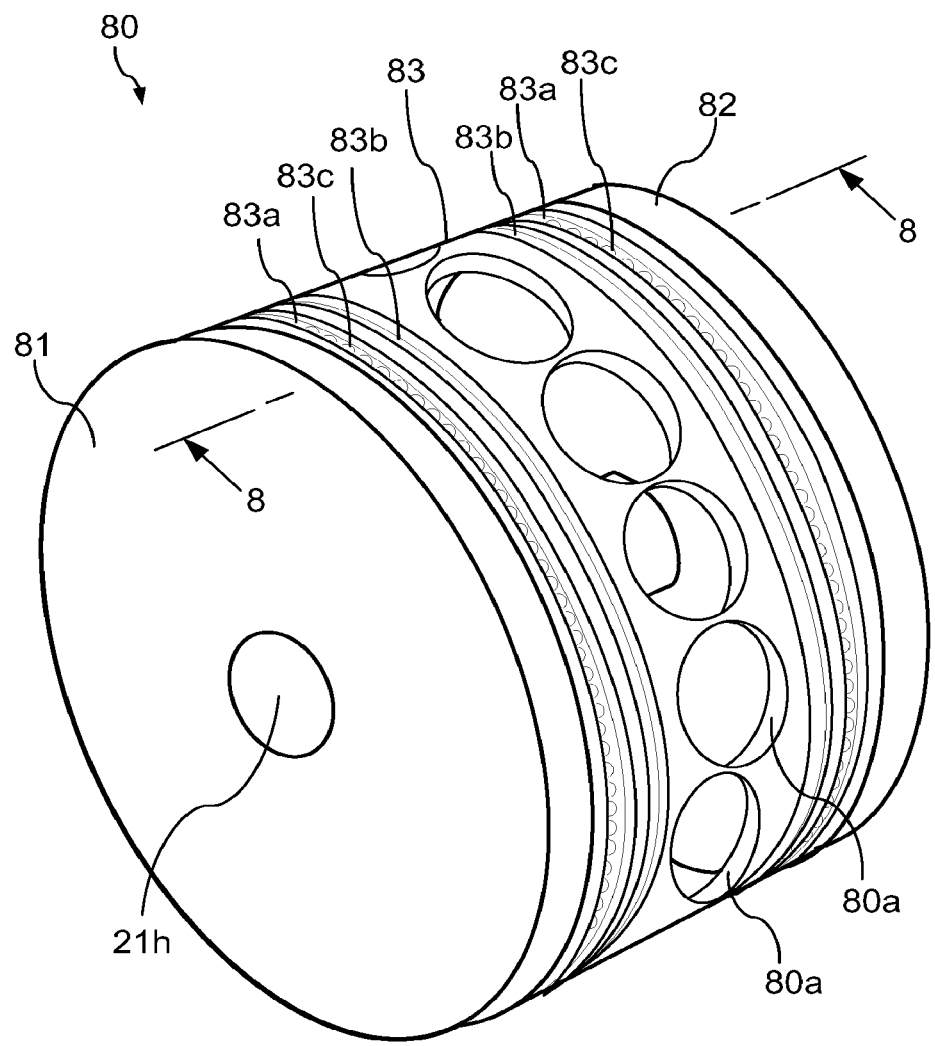
FIG. 7 is a perspective view of a pulley according to a second embodiment.
Figure 8:
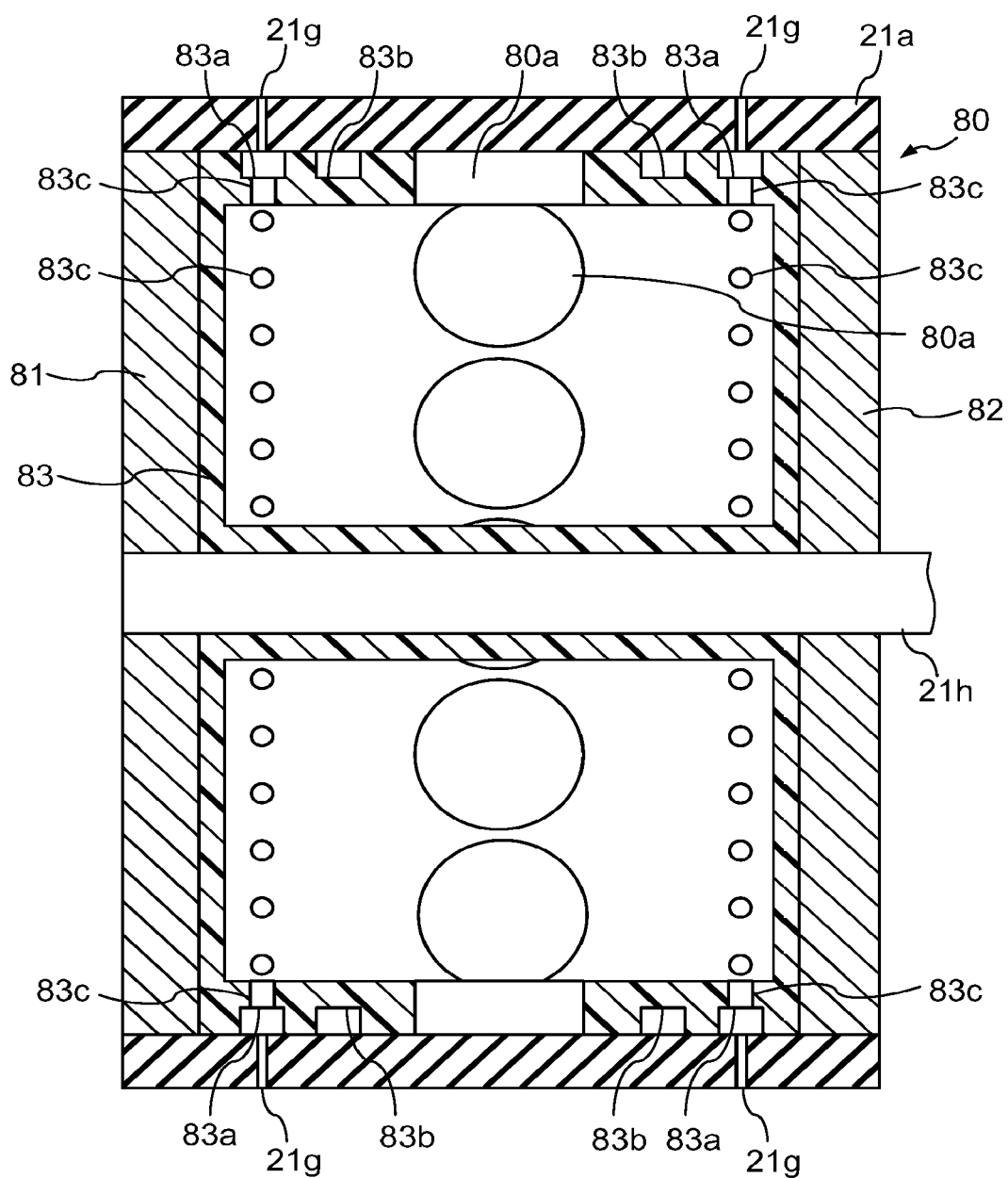
FIG. 8 is a cross-sectional view taken along line 8-8 of FIG. 7.

As illustrated in FIGS. 7 and 8, a pulley body of the second embodiment has an inner space. The pulley body 80 includes a pair of conveyor pulleys 81, and one guide pulley 83. The conveyor pulleys 81 and 82 have the same structure as the conveyor pulleys 71 and 72 of the first embodiment, and therefore the description thereof is omitted. Incidentally, the conveyor belt 21a is not illustrated in FIG. 7.

The guide pulley 83 is formed in a cylindrical shape. The guide pulley 83 is provided with a suction groove 83a and a groove 83b at its both ends. The suction groove 83a and the groove 83b extend over the entire outer periphery of the guide pulley 83 in the rotation direction of the guide pulley 83. The suction groove 83a is arranged in a position facing a row of the suction holes 21g of the conveyor belt 21a that is wrapped around the pulley body 80. The suction groove 83a has a plurality of through holes 83c in its bottom surface. The through holes 83c are aligned over the entire outer periphery of the guide pulley 83 in the rotation direction of the guide pulley 83. The diameter of each of the through holes 83c is, for example, about several millimeters. A plurality of through holes 80a are formed in the center of the guide pulley 83. The through holes 80a are aligned over the entire outer periphery of the guide pulley 83 in the rotation direction of the guide pulley 83. That is, the guide pulley 83 has the through holes 80a that are aligned in its rotation direction. The diameter of each of the through holes 80a is, for example, about several centimeters, which is larger than that of the through holes 83c. The inner space of the pulley body and the inner space of the chamber main body 61 communicate with each other through the through holes 80a.

According to such a pulley body 80, the inner space of the pulley body 80 and the inner space of the chamber main body 61 communicate with each other through each of the through holes 80a. When the air in the chamber main body 61 is sucked through the suction pipe 62, air is sucked from the inner space of the pulley body 80 through the through holes 80a by the chamber main body 61. Thereby, suction force is applied to the tablets T on the suction holes 21g of the conveyor belt 21a located around the outer periphery of the pulley body 80. Thus, the pulley body 80 functions as a chamber for sucking air from the suction holes 21g of the conveyor belt 21a located around the outer periphery of the pulley body 80.

Besides, the guide pulley 83 of the pulley body rotates together with the conveyor belt 21a. This reduces the force against the movement of the conveyor belt 21a, and the conveyor belt 21a moves smoothly, resulting in less load on the motor. Thereby, the vibration of the conveyor belt 21a can be suppressed. Accordingly, the conveyor belt 21a can stably convey the tablets T. As a result, it is possible to prevent reduction in print quality, the falling of the tablets T, and the like due to the vibration of the conveyor belt 21a.

As described above, according to the second embodiment, it is possible to achieve the same effects as those of the first embodiment. Further, the guide pulleys 73 and 74 can be integrated as a part of the guide pulley 83, which facilitates the assembly of the pulley body 80.

Third Embodiment

A third embodiment will be described with reference to FIG. 9. In the third embodiment, the difference (the configuration of the pulley body) from the first embodiment will be described, and the same description will not be repeated.

Figure 9:
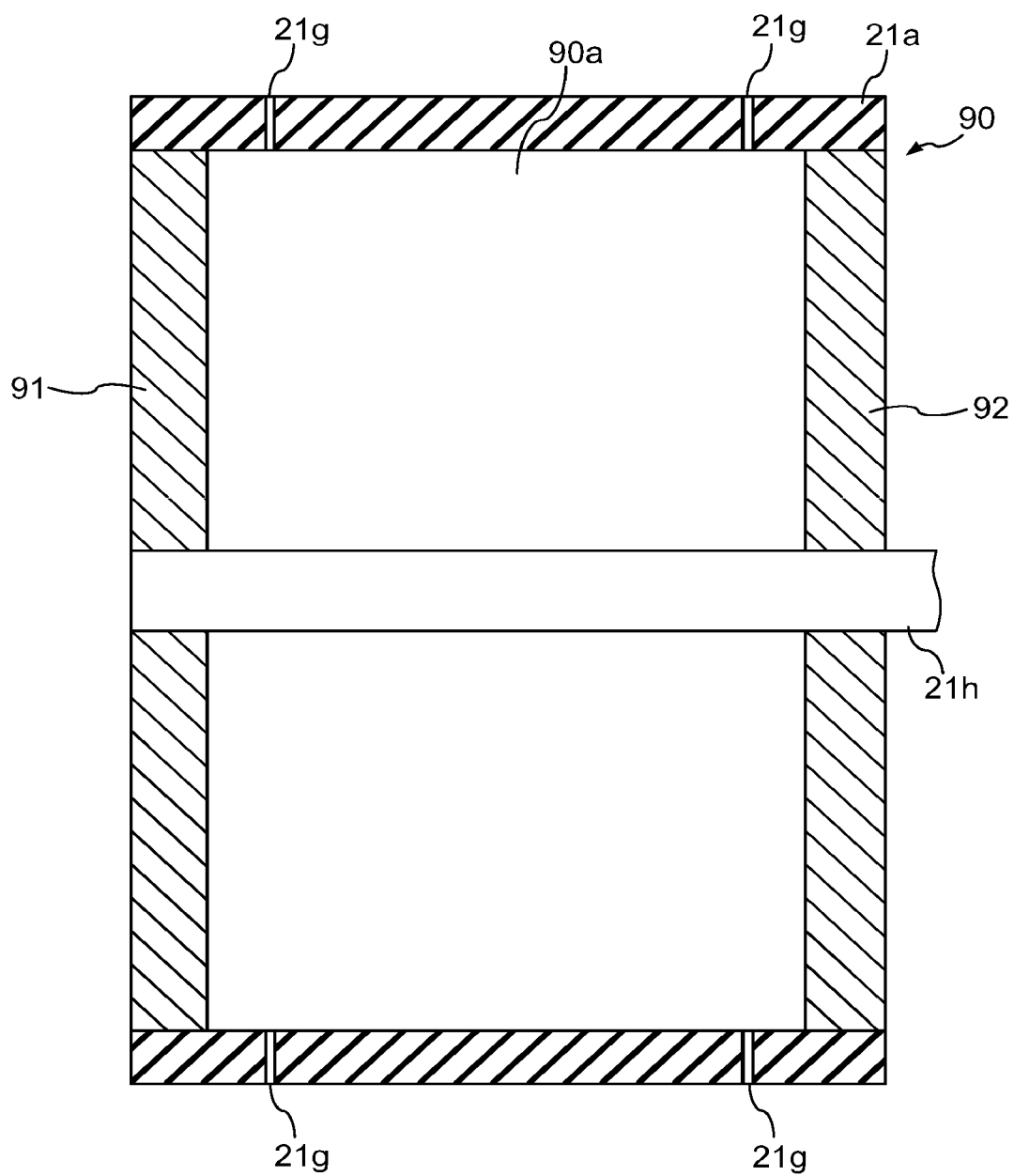
FIG. 9 is a cross-sectional view of a pulley according to a third embodiment.

As illustrated in FIG. 9, a pulley body 90 of the third embodiment has an inner space. The pulley body 90 is not provided with the guide pulleys 73 and of the first embodiment, but includes a pair of conveyor pulleys 91 and 92. The conveyor pulleys 91 and 92 have basically the same structure as the conveyor pulleys 71 and 72 of the first embodiment, and therefore only the differences will be described.

The conveyor pulleys 91 and 92 are arranged to face each other while being spaced apart in a direction in which the rotating shaft 21h of the motor 21d extends. Thereby, the pulley body 90 is provided with the gap between the conveyor pulleys 91 and 92 as an inner space 90a (the through hole). The width of the inner space 90a corresponds to the width formed by the conveyor pulleys 91 and 92 holding the width-direction ends of the conveyor belt 21a, and is about several centimeters to several tens of centimeters. The inner space 90a of the pulley body 90 and the inner space of the chamber main body 61 communicate with each other through an opening at an end of the chamber main body 61 on the pulley body 90 side.

According to such a pulley body 90, the inner space of the pulley body 90 and the inner space of the chamber main body 61 communicate with each other through the opening of the chamber main body 61 and the inner space 90a of the pulley body 90. When the air in the chamber main body 61 is sucked through the suction pipe 62, air is sucked from the inner space 90a of the pulley body 90 by the chamber main body 61. Thereby, suction force is applied to the tablets T on the suction holes 21g of the conveyor belt 21a located around the outer periphery of the pulley body 90. Thus, the pulley body 90 functions as a chamber for sucking air from the suction holes 21g of the conveyor belt 21a located around the outer periphery of the pulley body 90. The pulley body 90 is configured such that a chamber is formed by wrapping the conveyor belt 21a around the pulley body 90.

While the pulley body 90 has no guide, the conveyor pulleys 91 and 92 rotate together with the conveyor belt 21a. This reduces the force against the movement of the conveyor belt 21a, and the conveyor belt 21a moves smoothly, resulting in less load on the motor. Thereby, the vibration of the conveyor belt 21a can be suppressed. Accordingly, the conveyor belt 21a can stably convey the tablets T. As a result, it is possible to prevent reduction in print quality, the falling of the tablets T, and the like due to the vibration of the conveyor belt 21a.

As described above, according to the third embodiment, the vibration of the conveyor belt 21a can be suppressed as in the first embodiment. Therefore, the conveyor belt 21a can stably convey the tablets T. Further, since the need of the guide pulleys 73 and 74 can be eliminated, the configuration of the pulley body 90 can be simplified.

Fourth Embodiment

A fourth embodiment will be described with reference to FIG. 10. In the fourth embodiment, the difference (a suction force adjustment mechanism) from the first embodiment will be described, and the same description will not be repeated.

In the fourth embodiment, the inside of the suction chamber (the chamber 21f and the pulley body 21b) is divided into a plurality of compartments, and the suction force is adjusted with respect to each of the compartments such that less suction force is applied to the tablets T in a first area where printing is performed on the conveyor belt 21a than in a second area other than the first area. This suction force adjustment mechanism functions as a suction force adjustment device (adjuster). Incidentally, the first area is a predetermined area of the conveyor belt 21a that includes at least an area below the print head device 24, while the second area is an area other than the first area in the area of the conveyor belt 21a where the tablets T are sucked and held.

Figure 10:
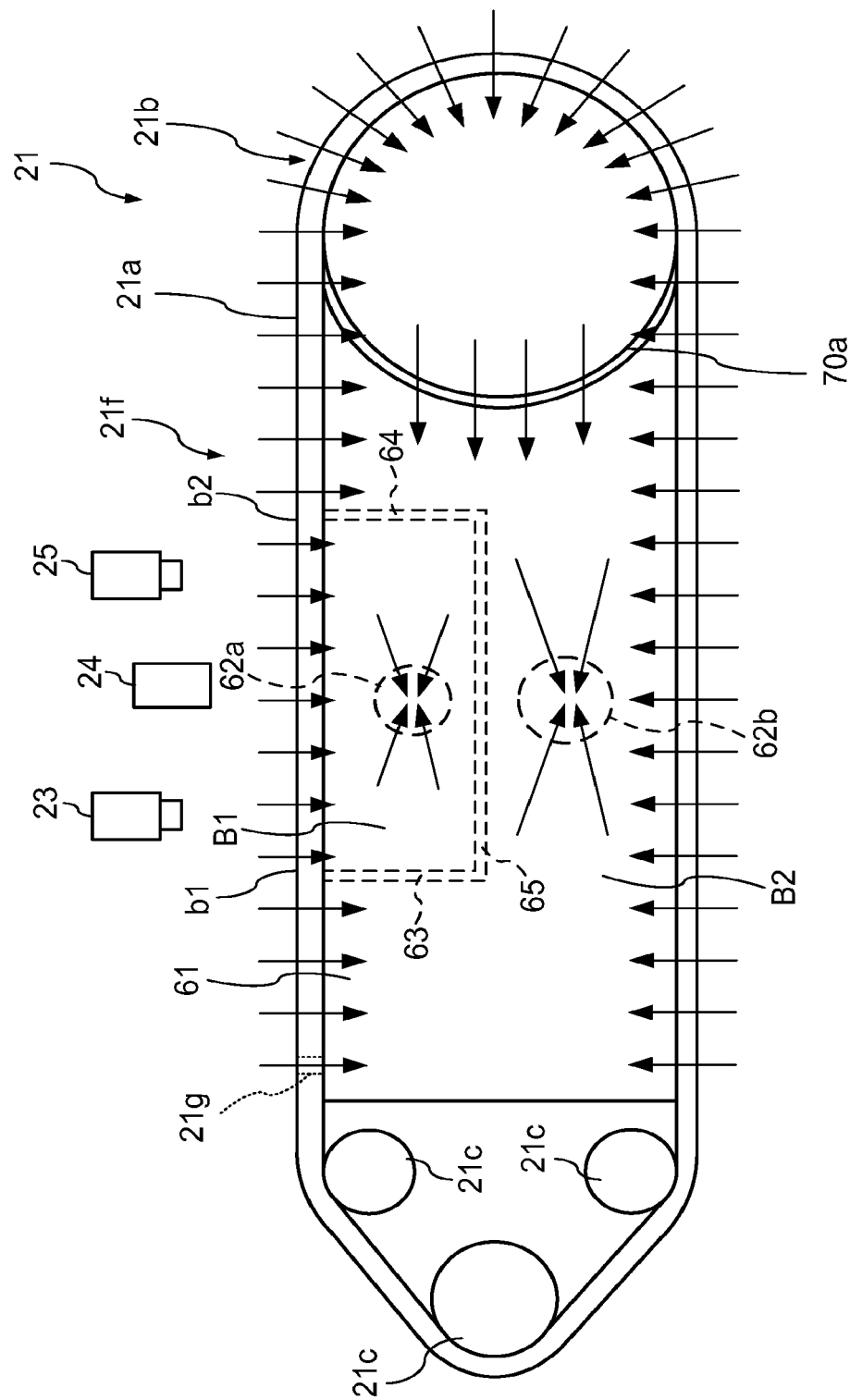
FIG. 10 is a diagram illustrating a part of a tablet printing apparatus according to a fourth embodiment.

As illustrated in FIG. 10, partition walls 63 and 64 are formed inside the chamber main body 61. The lower ends of the partition walls 63 and 64 are connected by a floor member 65 to form a room. As a result, the inside of the chamber main body 61 is divided into two compartments B1 and B2. In FIG. 10, the partition wall 63 is formed at the position indicated by reference symbol b1, and the partition wall 64 is formed at the position indicated by reference symbol b2. That is, the inside of the chamber main body 61 is divided into the first compartment B1 defined by the partition walls 63, 64 and the floor member 65 between the positions b1 and b2 and the second compartment B2 other than that. A suction pipe 62a is connected to the first compartment B1 and a suction pipe 62b is connected to the second compartment B2.

The two compartments B1 and B2 are divided by the partition walls 63, 64 and the floor member 65, and are provided with the suction pipes 62a and 62b, respectively. Accordingly, air does not alternate between the compartments B1 and B2. With this, a different suction force (suction pressure, amount of air sucked, speed of air suction) can be set for each of the compartments B1 and B2 to suck the air. For example, the suction force applied to the tablets T by the first compartment B1 is set to be less than the suction force applied to the tablets T by the second compartment B2.

The chamber 21f sucks air through the suction holes 21g, thus the tablets T on the conveyor belt 21a in the chamber 21f are sucked and held on the conveyor belt 21a. In other words, the tablets T are sucked and held in the suction holes 21g of the conveyor belt 21a by the suction force of the chamber 21f. At this time, some of the suction holes 21g may be closed by the tablets T and some may not. Specifically, not only the presence or absence of the tablet T that is sucked and held, the suction hole 21g may not be completely closed by the tablet T depending on the size, shape, posture, and the like of the tablet T. If the suction hole 21g is not completely closed by the tablet T, a space where air is sucked from the suction hole 21g toward the chamber 21f is created around the contact position between the suction hole 21g and the tablet T. In such a case, as the tablet T is sucked and held through the suction hole 21g, the air around the tablet T is sucked from above and side of the tablet T through the suction hole 21g. In particular, when the suction force of the chamber 21f is strong, an increased amount of air is sucked, and the air sucked flows at a higher speed. This may result in the generation of stronger airflow around the tablet T, an increase in the range of the reach of the airflow, or the turbulence of the airflow.

The print head device 24 for printing on the tablets T includes the inkjet print heads 24a (see FIG. 2). In the case of inkjet printing, ink is ejected from the print heads 24a toward the tablets T to be printed, and a print is made by the ink that has landed on the surface of each tablet T. The ink is flying after being ejected from the print heads 24a until it lands on the surface of the tablets T. At this time, if an airflow is generated in the space between the print heads 24a and the tablets T, the shape of the ink ejected from the print heads 24a and flying may be deformed due to the airflow, or the ink may not land on a desired position as its flying direction is influenced by the airflow. This causes printing defects and a reduction in print quality. There may be no problem as long as the airflow does not affect the print quality. However, if the airflow is strong and reaches a wide range, or the airflow is turbulent, the print quality is significantly reduced. Besides, if the influence of the airflow reaches around the nozzles of the print heads 24a for ejecting the ink, the ink around the nozzles dries. This causes ejection failure, resulting also in a reduction in print quality. Further, the ink which has not landed on the tablets T may scatter like mist. If the ink scatters like mist, for example, it is sucked together with the air sucked by the chamber 21f and adheres to the side surface of the tablets T being conveyed.

Therefore, in the fourth embodiment, less suction force is applied to the tablets T during printing to reduce the amount and flow rate of air to be sucked so that printing defects due to airflow or mist can be reduced as much as possible. Specifically, the suction force applied to the tablets T is reduced at least while the tablets T are passing under the print head device 24 for printing compared to that applied to those in other locations on the conveyor belt 21a. The reduced suction force is determined in advance by experiments in consideration of conveyance displacement, printing defects, and the like due to airflow and mist.

Assuming that the suction force adjustment mechanism is used in a common suction chamber (the pulley does not constitute a part of the suction chamber), the suction force in the first area becomes lower than in the second area. Accordingly, the tablets T on the conveyor belt 21a may not be sucked sufficiently to be held in the printing area under the print head device 24. As a result, the tablets T are likely to shake due to vibrations from the conveying device. If the tablets T are not sufficiently held and are shaking, a print on each of the tablets T may be blurred or doubled, thus causing printing defects.

Therefore, according to the fourth embodiment, the suction force adjustment mechanism is used in the suction chamber of the first embodiment (the pulley constitutes a part of the suction chamber). This suppresses the vibration of the conveyor belt 21a as in the first embodiment while preventing reduction in print quality caused by airflow as described above. Accordingly, the conveyor belt 21a can stably convey the tablets T. Thereby, the tablets T are sucked sufficiently to be held in the printing area under the print head device 24 and are less likely to shake. Thus, it is possible to suppress reduction in print quality due to the shaking of the tablets T.

The suction force may be reduced not only for the tablets T passing under the print head device 24 but also for those being conveyed, for example, from a predetermined position upstream of the print head device 24 (the position b1) to a predetermined position downstream of the print head device 24 (the position b2) after passing through under the print head device 24. Specifically, on the upstream side of the print head device 24, after the tablets T are supplied to the conveyor belt 21a, the suction force may be reduced from before the tablets T pass under the first imaging device 23 that detects the position and posture of each of the tablets T on the conveyor belt 21a. On the downstream side of the print head device 24, after the print head device 24 performs printing on the tablets T, the suction force may be kept reduced until the tablets T have passed through under the second imaging device 25 that detects the position and posture of each of the tablets T on the conveyor belt 21a.

The first imaging device 23 detects the position and posture of each of the tablets T which is just going to be subjected to printing, while the second imaging device 25 detects the print position (print condition) of a print pattern on the tablet T after the printing. The imaging devices 23 and 25 are required to detect the position and posture or print condition of each of the tablets T in the same state as during printing, i.e., being sucked with less suction force. For example, if the suction force changes significantly during the conveyance of the tablets T, the tablets T may shift or shake, and their position and posture may change. If the position and posture of the tablets T change due to such a significant change in the suction force until printing is completed after the first imaging device 23 detects the position and posture, the printing may not be performed properly. Besides, if the position and posture of the tablets T change during the period from the end of the printing until the second imaging device 25 detects the print condition of the tablets T, the detection may not be performed properly. Therefore, it is preferable that there be no significant change in the suction force during the period from the detection of the position, posture, and the like of the tablets T by the first imaging device 23 until printing is completed or from the end of the printing until the second imaging device 25 detects the print condition of the tablets T such that the position and posture of the tablets T detected have not changed. The suction force may be maintained so as not to change significantly between the first imaging device 23 and the second imaging device 25. With this, it is possible to detect the position and posture or print condition of the tablets T being sucked with less suction force in the same state as during printing.

In the area where the tablets T are conveyed on the conveyor belt 21a, the tablets T are sucked with reduced suction force to be held on the conveyor belt 21a in the first area. Therefore, in the above example, an area from a predetermined position (the position b1) before the tablets T pass under the first imaging device 23 after being supplied to the conveyor belt 21a to a predetermined position (the position b2) after the tablets T have passed through under the print head device 24 and the second imaging device 25 corresponds to the first area. That is, the first area includes an area from where the first imaging device 23 captures images of the tablets T to where the second imaging device 25 captures images of the tablets T on the conveyor belt 21a. Although suction force is applied to the suction holes 21g over the entire circumference of the conveyor belt 21a, the suction force need not be particularly reduced in the second area other than the first area since there is no need to consider the influence on the ink flying at the time of printing. The suction force is only required to be larger than the self-weight of the tablets T and the centrifugal force generated during conveyance.

(Modifications)

The above description has been made assuming that the inside of the suction chamber (the chamber 21f and the pulley body 21b) is divided into two compartments B1 and B2 to apply two levels of suction force. However, the number of levels of suction force applied to the tablets T is not limited to two, and the level of suction force may be controlled for each process performed in the tablet printing apparatus 1. In this case, two or more levels of suction force are appropriately applied to the tablets T.

For example, the inside of the suction chamber may be divided into three compartments (an upper compartment and a lower compartment in the chamber 21f, and a compartment in the pulley body 21b). In this case, a suction force that does not affect printing but is sufficient to prevent the tablets T from shifting or shaking is assigned to the upper compartment in the chamber 21f. Meanwhile, a suction force that prevents the tablets T from falling is assigned to the lower compartment, and a suction force that prevents the tablets T from falling and also counteracts against the centrifugal force is assigned to the compartment in the pulley body 21b, i.e., a compartment where the tablets T move in the circumferential direction of the pulley body 21b. With this, the tablets T can be more appropriately sucked and held on the conveyor belt 21a. Although the lower compartment in the chamber 21f and the compartment in the pulley body 21b require a suction force considerably larger than that of the upper compartment in the chamber 21f, an optimal suction force can be appropriately applied to the tablets T in each process (at each location where the tablets T are conveyed). Incidentally, the upper compartment in the chamber 21f corresponds to the first area on the conveyor belt 21a where the suction force is reduced as described above. The lower compartment and the compartment in the pulley body 21b correspond to the second area. While the lower compartment in the chamber 21f and the compartment in the pulley body 21b may be assigned different levels of suction force, their suction force is set larger than that of the upper compartment in the chamber 21f.

As described above, the suction force is reduced during printing so as not to generate an airflow that causes printing defects as compared to the suction force sufficient to ensure that the tablets T are sucked to be reliably held on at any position on the conveyor belt 21a even if an airflow is generated around the tablets T on the conveyor belt 21a due to the suction. Since printing is performed in the upper area of the conveyor belt 21a between the pulley body 21b and the driven pulleys 21c, the tablets T are supported by the conveyor belt 21a. Therefore, even if the suction force is reduced in the upper area than in other areas, it does not affect the conveyance.

Besides, the tablets T are shaking after being transferred from the supply device 10 to the conveying device 21 or from the conveying device 21 to the conveying device 31. If the tablets T are shaking, accurate position detection and printing cannot be performed. For this reason, it is preferable that a larger suction force be applied in a position near where the tablets T are transferred on the receiver side. The larger suction force can stop the shaking of the tablets T quickly. That is, in the upper compartment in the chamber 21f of the conveying device or the chamber 31f of the conveying device 31, there may further be provided a compartment that corresponds to the area where the tablets T are transferred. In this case, the compartment is assigned a suction force that can stop the shaking of the tablets T quickly.

As described above, there can be provided as many compartments as necessary in desired parts. In other words, the first and second compartments (regions) of the suction chamber can be further divided into compartments, and the suction force of each of them can be set appropriately. Incidentally, there is a change in the level of suction force at the border between compartments each assigned a different level of suction force. If the change is large, the tablets T may shift, shake, or fall from the belt. Therefore, a compartment for moderating the change in suction force may be provided in front of and behind a compartment that makes the necessary suction force. This enables the gradual change of the suction force across the compartments, thereby suppressing the tablets T from shifting, shaking, or falling from the belt.

Fifth Embodiment

A fifth embodiment will be described with reference to FIGS. 11 to 13. In the fifth embodiment, the difference (a suction force lowering member) from the fourth embodiment will be described, and the same description will not be repeated.

In the fourth embodiment described above, the inside of the suction chamber (the chamber 21f and the pulley body 21b) is divided into a plurality of compartments each assigned a different level of suction force such that the suction force applied to the tablets T in the first area where printing is performed on the conveyor belt 21a is reduced as compared to the suction force applied to the tablets T in the second area. On the other hand, in the fifth embodiment, a suction force lowering member 66 (see FIGS. 11 and 12) is used to reduce the suction force applied to the tablets T in the first area than in the second area without dividing the inside of the suction chamber into a plurality of compartments. The suction force lowering member 66 functions as a suction force adjustment device (adjuster).

Note that the suction force generated by the suction chamber refers to a suction force, for example, that is generated in the suction grooves 61b (see FIG. 12) formed in the chamber main body 61 by discharging air from the suction chamber, and is determined based on the amount of air to be discharged and the discharge speed. The suction force generated in the suction grooves 61b acts on the tablets T through the suction holes 21g of the conveyor belt 21a, thereby pulling the tablets T onto the conveyor belt 21a. The pulling force is the suction force applied to the tablets T. Accordingly, in the fifth embodiment, the suction force lowering member 66 is used to reduce the suction force that acts on the tablets T on the conveyor belt 21a without changing the amount of air to be discharged from the chamber main body 61 and the discharge speed.

Figure 11:
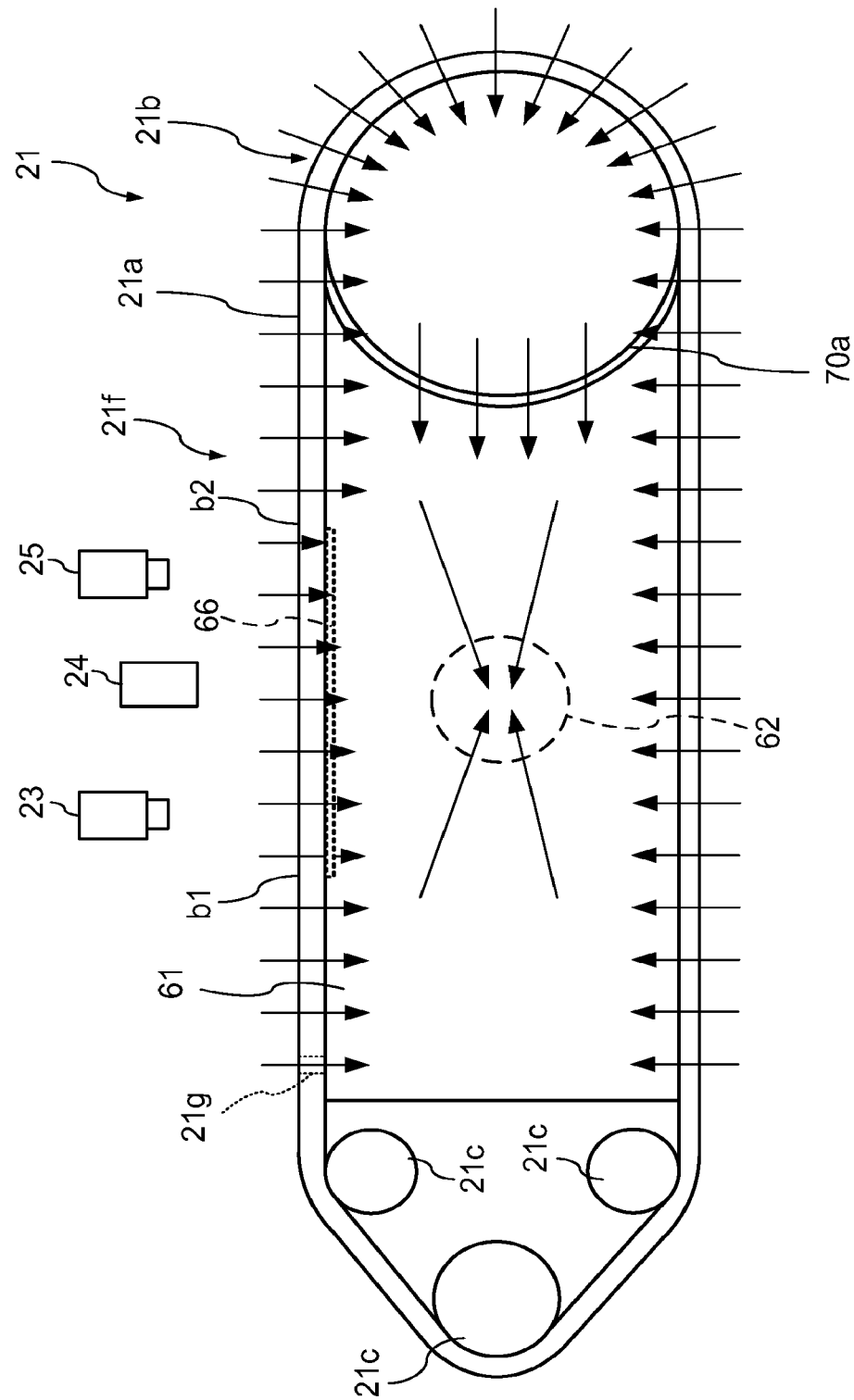
FIG. 11 is a diagram illustrating a part of a tablet printing apparatus according to a fifth embodiment.

As illustrated in FIG. 11, the suction force lowering member 66 is arranged in the first area (the range from the position b1 to the position b2) of the conveyor belt 21a. The suction force lowering member is provided for each conveying path of the tablets T, i.e., for each of the suction grooves 61b.

Figures 12, 13:
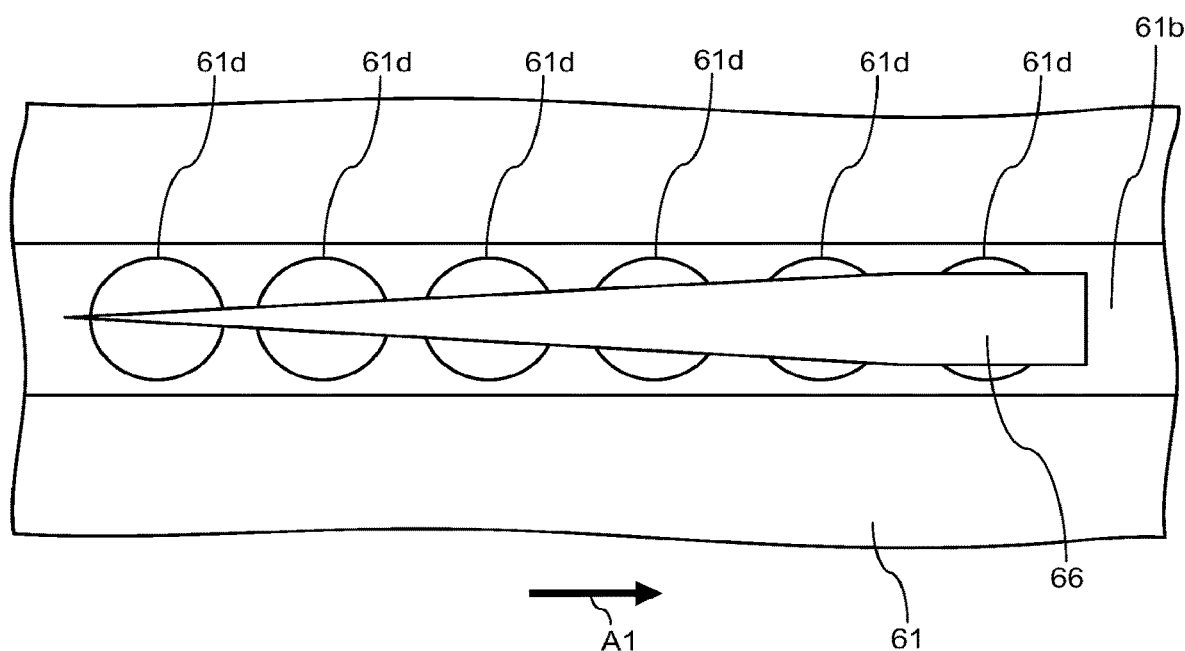
FIG. 12 is a plan view of a suction force lowering member of the fifth embodiment.
FIG. 13 is a diagram for explaining various comparison results between a suction chamber of the fifth embodiment and a common suction chamber.

As illustrated in FIG. 12, the suction force lowering member 66 is detachably attached to the bottom surface of each of the suction grooves 61b. The suction force lowering member 66 is formed in, for example, a triangular shape such that the opening area of the through holes 61d aligned in the conveying direction A1 is gradually reduced along the conveying direction A1. With this, the suction force applied to the tablets T in the first area gradually decreases along the conveying direction A1.

Since the suction force lowering member 66 is detachable, the user can move the suction force lowering member 66 in the conveying direction A1 or replace it with another as necessary to reduce the suction force in a desired pattern in a desired area. That is, the user can easily adjust the suction force or the position where the suction force is reduced. Further, the user can easily perform maintenance for removing and cleaning the suction force lowering member 66.

As described above, the suction force lowering member 66, which is arranged in the first area of the conveyor belt 21a, reduces the suction force of the suction holes 21g in the first area. Accordingly, the amount and flow rate of air sucked from the suction holes 21g decrease. Thus, it is possible to suppress the occurrence of printing defects due to airflow or mist. Specifically, at least the suction force for sucking the tablets T passing under the print head device 24 (in an area of the conveyor belt 21a below the upstream end to the downstream end of the print head device 24) can be reduced as compared to the suction force for sucking the tablets T in other positions on the conveyor belt 21a.

In addition, since the suction force is gradually reduced in the first area of the conveyor belt 21a, it is possible to suppress the position deviation of the tablets T due to a sudden drop in suction force. For example, if the suction force suddenly changes, the tablets T may shift, shake, or fall from the conveyor belt 21a. However, by making the suction force change gradually, occurrence of such troubles can be suppressed.

Assuming that the suction force lowering member is used in a common suction chamber (the pulley does not constitute a part of the suction chamber), as in the concern of the fourth embodiment described above, the conveyor belt 21a swings in the state where the suction force is reduced. As a result, if the tablets T are not sufficiently held and are shaking, a print on each of the tablets T may be blurred or doubled, thus causing printing defects.

Therefore, according to the fifth embodiment, the suction force lowering member 66 is used in the suction chamber of the first embodiment (the pulley constitutes a part of the suction chamber). This suppresses the vibration of the conveyor belt 21a as in the first embodiment while preventing reduction in print quality caused by airflow as described above. Accordingly, the conveyor belt 21a can stably convey the tablets T. Thereby, the tablets T are sucked sufficiently to be held in the printing area under the print head device 24 and are less likely to shake. Thus, it is possible to suppress reduction in print quality due to the shaking of the tablets T.

FIG. 13 is a diagram for explaining the comparison of the motor load factor, chamber pressure, conveyor belt vibration, and print quality between a common chamber provided with the suction force lowering member 66 and the suction chamber of this embodiment (the fifth embodiment).

For example, as illustrated in FIG. 13, in the case of the common suction chamber, the motor load factor is 98%, the chamber pressure is −1.9 kPa, the vibration of the conveyor belt 21a is large, and there is blur (printing defect). On the other hand, in the case of the suction chamber of the fifth embodiment, the motor load factor is 37%, the chamber pressure is −1.9 kPa, the vibration of the conveyor belt 21a is small, and there is no blur (printing defect). That is, in the case of the suction chamber of the fifth embodiment, even if the chamber pressure is the same as that of the common suction chamber, the motor load factor is low and the conveyor belt 21a vibrates less as compared to the case of the common suction chamber, and also no blur is observed. As described above, while the pressure in the suction chamber is kept the same in both the suction chambers, the suction chamber of the fifth embodiment can reduce the motor load factor significantly as well as reducing the vibration, and suppress blurring.

The suction force lowering member 66 may be located at any position in the suction grooves 61b as long as it does not contact the conveyor belt 21a. The suction force lowering member 66 need not necessarily be located in the suction grooves 61b, but may be arranged in any position as long as it can regulate the amount of air passing through the through holes to reduce the suction force that acts on the tablets T via the conveyor belt 21a. Alternatively, there may be provided another member.

(Modifications)

A type of suction force lowering member 66 has been described above. However, another member such as, for example, a flange-like member or a plate-like member can also be used as the suction force lowering member 66 if it can produce the same effect as that of the suction force lowering member 66. The level of suction force to be applied to the tablets T can be set freely by the shape and the number of flange-like or plate-like members, or the size, the shape, and the number of openings formed in the plate-like member.

The suction force lowering member 66 may have any shape as long as it can gradually change the opening area of an array of the through holes 61d. A punched board, a mesh member, a porous member, or the like can be used as the suction force lowering member 66. In this case, the density of the holes is reduced such that the opening area of the through holes 61d gradually decreases along the conveying direction A1. Further, a plurality of punched boards or mesh members may be arranged one on top of another. In this case, the suction force applied to the tablets T passing in the first area can be adjusted by relatively shifting the punched boards or the mesh members to change the size and the opening ratio of holes in the punched boards or the size and the opening ratio of the mesh.

The suction force may be reduced by, for example, reducing the size of the through holes 61d without the suction force lowering member 66. A variety of suction force adjustment mechanisms (suction force adjustment devices) can be used.

Sixth Embodiment

A sixth embodiment will be described with reference to FIG. 14. In the sixth embodiment, the difference (the suction chamber) from the fifth embodiment will be described, and the same description will not be repeated.

Figure 14:
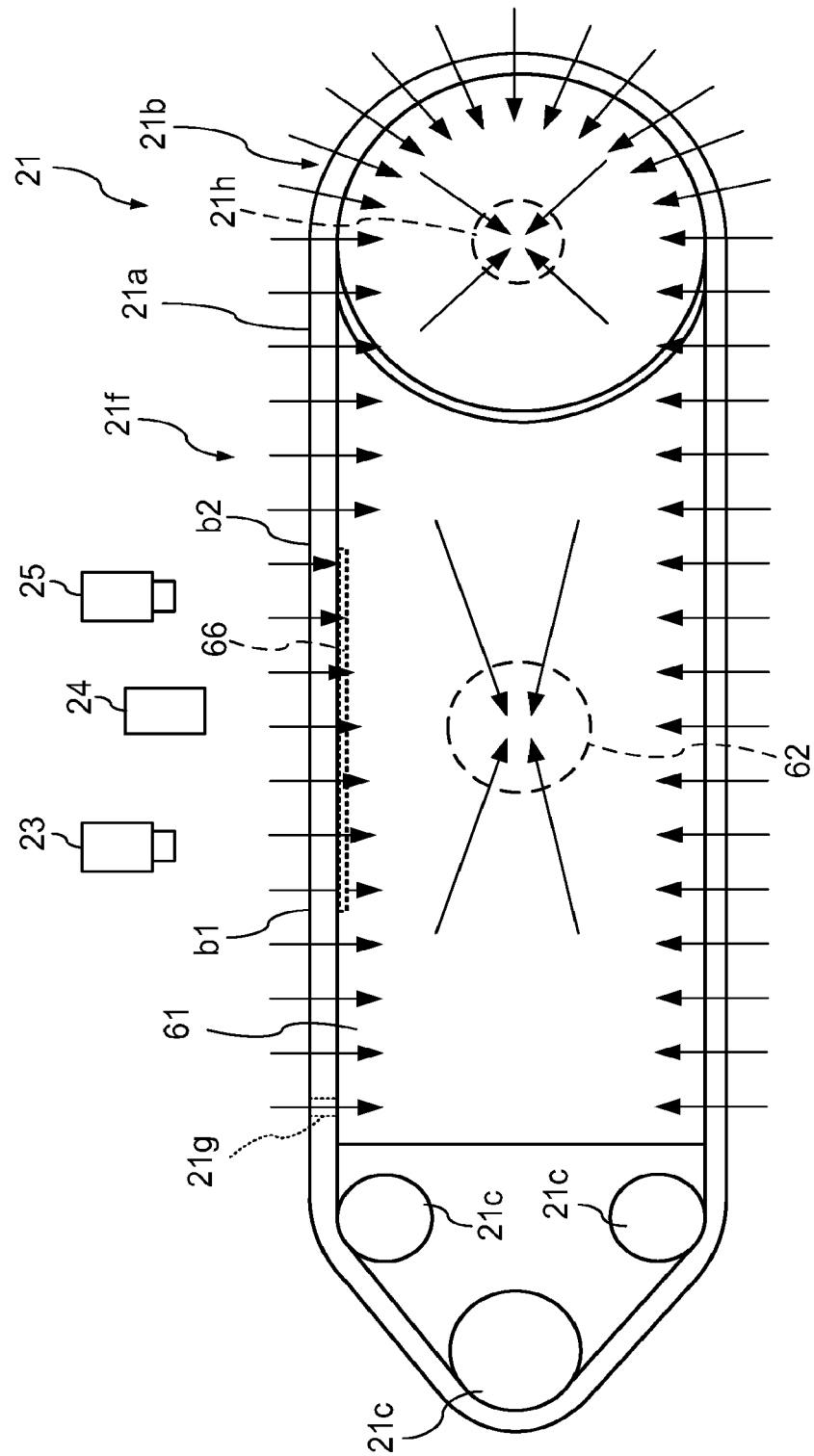
FIG. 14 is a diagram illustrating a part of a tablet printing apparatus according to a sixth embodiment.

As illustrated in FIG. 14, the chamber 21f and the pulley body 21b of the sixth embodiment constitute a suction chamber as in the first embodiment; however, the inner space of the chamber 21f and the inner space of the pulley body 21b are not connected. Specifically, the opening of the chamber 21f is closed on the pulley body 21b side, and the opening of the slit-shaped through hole 70a is also closed in the pulley body 21b. Accordingly, the inner space of the chamber 21f and the inner space of the pulley body 21b do not communicate with each other.

The pulley body 21b is connected to the rotating shaft 21h that passes through the inner space of the pulley body 21b. The rotating shaft 21h is formed in a hollow shape, and is provided with a plurality of through holes (not illustrated) arranged in its circumferential direction on the outer periphery. The inner space of the rotating shaft 21h and the inner space of the pulley body 21b communicate with each other through these through holes. The rotating shaft 21h is connected to a suction pipe (not illustrated) via a connecting member (not illustrated) such as a rotary joint, and the suction pipe is connected to a suction device (not illustrated) such as a pump.

In this configuration, the air in the chamber main body 61 is sucked through the suction pipe 62. Thereby, suction force is applied to the tablets T on the suction holes 21g of the conveyor belt 21a located around the outer periphery of the chamber main body 61. On the other hand, the air in the pulley body 21b is sucked through the rotating shaft 21h and the suction pipe and flows through the inside of the rotating shaft 21h and the inside of the suction pipe. As a result, suction force is applied to the tablets T on the suction holes 21g of the conveyor belt 21a located around the outer periphery of the pulley body 21b. The pulley body 21b rotates together with the conveyor belt 21a.

This configuration also suppresses the vibration of the conveyor belt 21a while preventing reduction in print quality caused by airflow as in the fourth and fifth embodiments. Accordingly, the conveyor belt 21a can stably convey the tablets T. Thereby, the tablets T are sucked sufficiently to be held in the printing area under the print head device 24 and are less likely to shake. Thus, it is possible to suppress reduction in print quality due to the shaking of the tablets T.

Seventh Embodiment

A seventh embodiment will be described with reference to FIGS. 15 to 21. In the seventh embodiment, the difference (a cover, gas blowing units, and gas suction units) from the first embodiment will be described, and the same description will not be repeated.

Figure 15:
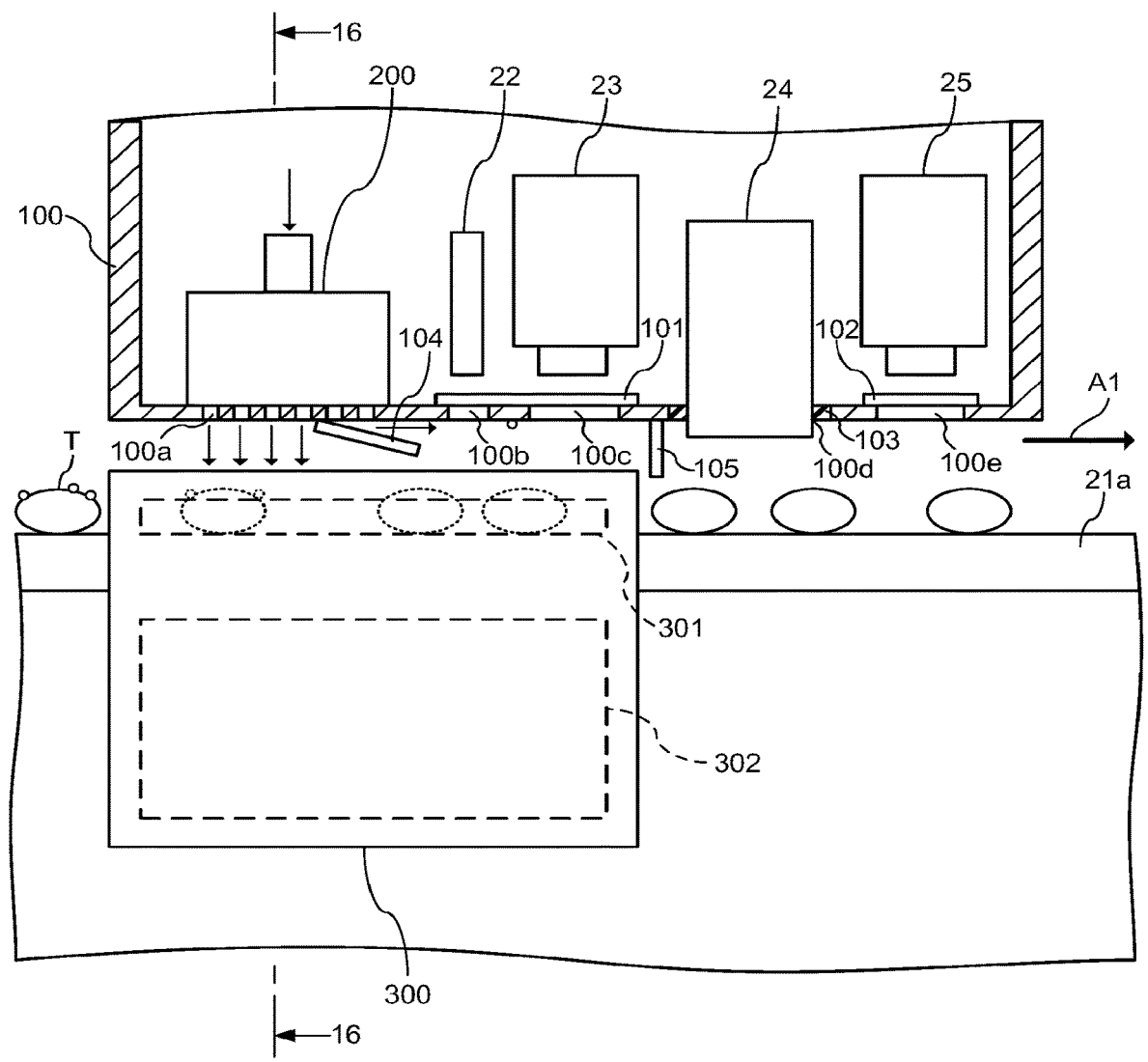
FIG. 15 is a diagram illustrating a part of a tablet printing apparatus according to a seventh embodiment.
Figure 16:
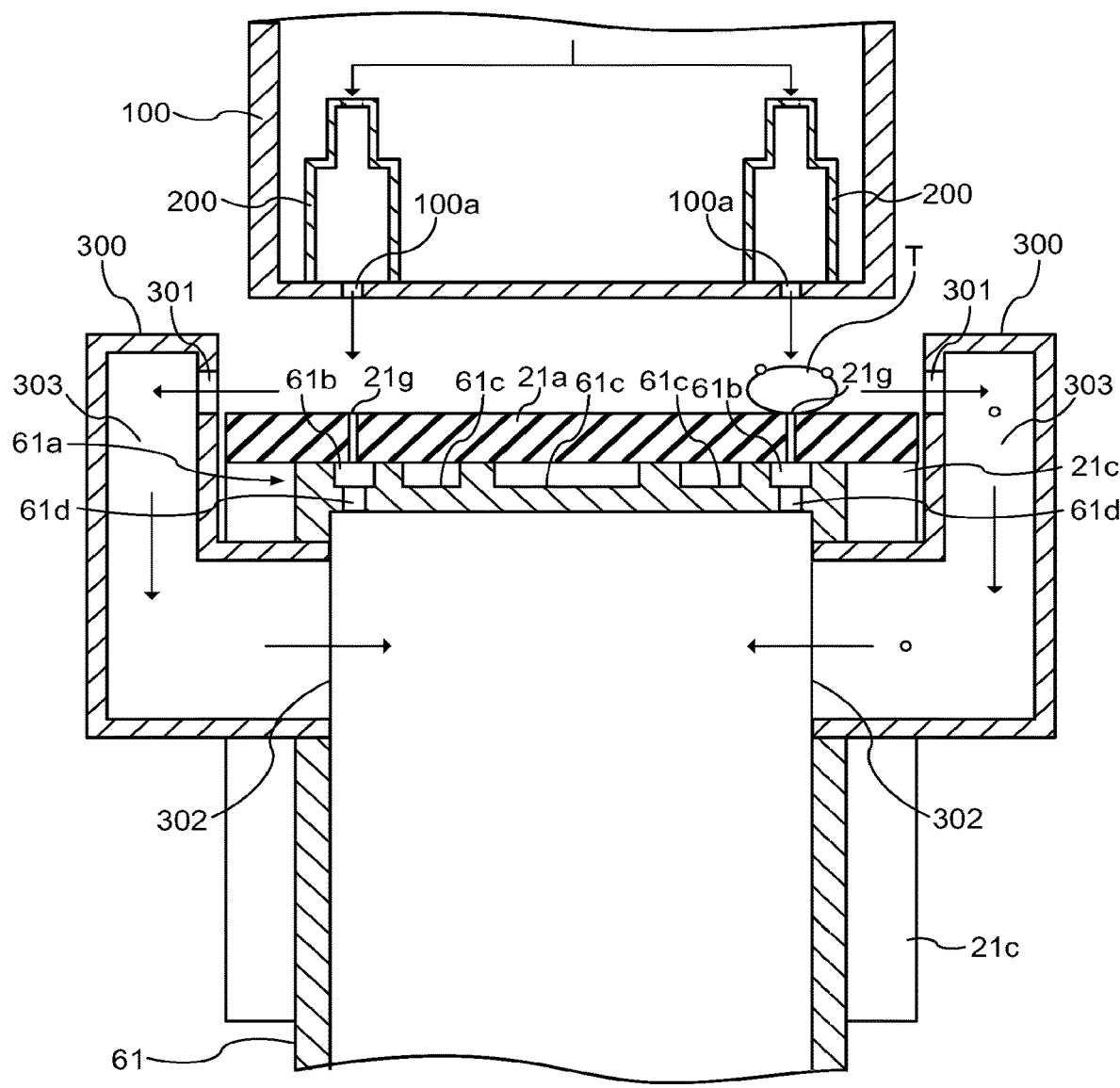
FIG. 16 is a cross-sectional view taken along line 16-16 of FIG. 15.

As illustrated in FIGS. 15 and 16, in the seventh embodiment, there are provided a cover 100, two gas blowing units (blowers) 200, and two gas suction units (members) 300. The gas blowing units 200 and the gas suction units 300 function as a deposit removing mechanism (remover). The deposit removing mechanism is configured to blow gas (for example, air or inert gas) to deposits (for example, powder and dust) adhering to the tablets T on the conveyor belt 21a or the lower surface of the cover 100 to blow the deposits away therefrom, and suck the deposits together with air, thereby removing the deposits from the tablets T or the lower surface of the cover 100. Besides, the powders of the tablets T may sometimes be scattered in the apparatus as the tablets T are being conveyed by the conveyor belt 21a. The gas blowing units 200 and the gas suction units 300 also remove such powders scattered in the apparatus, particularly, powders flying around the cover 100.

As illustrated in FIG. 15, the cover 100 is a housing that houses the gas blowing units 200, the detecting device 22, the first imaging device 23, the print head device 24, and the second imaging device 25. The cover 100 is located above the conveyor belt 21a such that its lower surface is spaced apart from the upper surface of the conveyor belt 21a by a predetermined distance (for example, 4 mm to 5 mm).

A plurality of through holes 100a are formed in the lower surface of the cover 100 so that each of the gas blowing units 200 in the cover 100 can blow gas against the upper surface of the conveyor belt 21a. For example, the through holes 100a are arranged in a row in the conveying direction A1 of the tablets T with respect to each of the gas blowing units 200. The gas blown out from the gas blowing units 200 passes through the through holes 100a that penetrate the lower surface of the cover 100 and is blown onto the conveyor belt 21a. The diameter of the through holes 100a is, for example, several millimeters (for example, about 2 mm).

Further, two through holes 100b are formed in the lower surface of the cover 100 so that the detecting device 22 (the two detectors 22a) in the cover 100 can detect the tablets T on the conveyor belt 21a. The through holes 100b are arranged in a direction perpendicular to the conveying direction A1 of the tablets T in the horizontal plane. Two through holes 100c are also formed in the lower surface of the cover 100 so that the first imaging device 23 (the two imaging units 23a) in the cover 100 can capture images of the tablets T on the conveyor belt 21a. The through holes 100c are arranged in the same direction as the through holes 100b. Still further, one through hole 100d is formed in the lower surface of the cover 100 so that the print head device 24 in the cover 100 can perform printing on the tablets T on the conveyor belt 21a. In addition, two through holes 100e are formed in the lower surface of the cover 100 so that the second imaging device 25 (the two imaging units 25a) in the cover 100 can capture images of the tablets T on the conveyor belt 21a. The through holes 100e are arranged in the same direction as the through holes 100b.

The through holes 100a are each covered with one of the gas blowing units 200 located on the bottom surface inside the cover 100. The through holes 100b, 100c and 100e are respectively covered with translucent members 101 and 102 such as glass arranged on the bottom surface inside the cover 100. The through hole 100d is closed with the print head device that is inserted therein through a sealing member 103 such as silicone. In this manner, the cover 100 is in a sealed state, and the inside of the cover 100 is maintained under positive pressure.

The gas blowing units 200 are each connected to one of the through holes 100a in the lower surface of the cover 100, and blow gas from the through holes 100a onto the conveyor belt 21a. With this, the gas is blown onto the tablets T on the conveyor belt 21a while the tablets T are passing under the gas blowing units 200, and thereby deposits adhering to the tablets T are blown away from the tablets T. Each of the gas blowing units 200 is connected to a gas supply unit (not illustrated) through a flow regulating valve (not illustrated), and is supplied with gas from the gas supply unit.

On the lower surface of the cover 100, there are provided guide plates 104, one for each of the gas blowing units 200. Each of the guide plates 104 is located below corresponding one of the gas blowing units 200 on the downstream side in the conveying direction A1 of the tablets T. The guide plates 104 are formed in a rectangular shape, the longitudinal direction of which is parallel to the direction perpendicular to the conveying direction A1 of the tablets T in the horizontal plane, and are inclined to the print head device 24 side. The guide plates 104 let a part of gas blown out from the gas blowing units 200 through the through holes 100a flow toward the downstream side in the conveying direction A1 of the tablets T, thereby generating an airflow flowing along the lower surface of the cover 100 in the conveying direction A1 of the tablets T. With this, the gas is blown against the deposits adhering to the lower surface of the cover 100, and thereby the deposits are blown away therefrom. While the guide plates 104 are described as each being provided with respect to each of the two gas blowing units 200 arranged in two rows, it is not so limited. A single guide plate 104 may be shared between the gas blowing units 200.

Further, on the lower surface of the cover 100, there are provided shield plates 105, one for each of the gas blowing units 200. Each of the shield plates 105 is located between the first imaging device 23 and the print head device 24 (at least on the upstream side of the print head device 24 in the conveying direction A1 of the tablets T). The shield plates 105 are formed in a rectangular shape, the longitudinal direction of which is parallel to the direction perpendicular to the conveying direction A1 of the tablets T in the horizontal plane. The shield plates 105 are arranged perpendicularly to the lower surface of the cover 100. The shield plates 105 have a longitudinal length capable of covering a region where the nozzles 24b of the print head device 24 are formed. Each of the shield plates 105 is located at a height where it does not contact the tablets T being conveyed thereunder. The shield plates 105 block the gas that is guided by the guide plates 104 and flows along the lower surface of the cover 100. Thus, it is possible to prevent the airflow flowing along the lower surface of the cover 100 from adversely affecting the printing of the print head device 24.

While the shield plates 105 are described as each being provided with respect to each of the two gas blowing units 200 arranged in two rows, it is not so limited. A single shield plate 105 may be shared between the gas blowing units 200. The shield plate 105 may be arranged in the print head device 24. If the print head device 24 is provided with the shield plate 105, when printing is to be performed on different type of tablets T having a different thickness, the height position of the shield plate 105 is adjusted automatically as the height position of the print head device 24 is adjusted. Therefore, it is not necessary to adjust only the height position of the shield plate 105 according to the thickness of the tablets T, thus being efficient.

The gas suction units 300 are arranged adjacent to the side surfaces of the conveyor belt 21a such that the conveyor belt 21a is located between them, and attached to the chamber main body 61. The gas suction units 300 each include an inlet port 301, an outlet port 302, and an internal flow path 303 (see FIG. 16).

The inlet port 301 and the outlet port 302 are formed in a rectangular shape (slit shape) extending in the conveying direction A1 of the tablets T. The inlet port 301 is an opening for sucking air from the space between the upper surface of the conveyor belt 21a and the lower surface of the cover 100. The inlet port 301 is located on the conveyor belt 21a side in the gas suction unit 300 at a position higher than the upper surface of the conveyor belt 21a. The opening of the inlet port 301 is formed such that the terminal end thereof is located upstream of the shield plate 105 in the conveying direction A1. Thereby, gas from each of the gas blowing units 200 does not flow to the print head device 24. Thus, the nozzles 24b of the print head device 24 are prevented from drying and causing ejection failure, and the liquid ejected from the nozzles 24b is prevented from being influenced by airflow, resulting in the ejection direction disorder. The outlet port 302 is located on the conveyor belt 21a side in the gas suction unit 300 at a position lower than the conveyor belt 21a, and is connected to the inside of the chamber main body 61. The internal flow path 303 is formed inside the gas suction unit 300 and is a flow path that connects the inlet port 301 and the outlet port 302.

When the inside of the chamber main body 61 is sucked for conveying the tablets T, air is sucked from the outlet port 302 in each of the gas suction units 300. Then, air in the space between the upper surface of the conveyor belt 21a and the lower surface of the cover 100 is sucked from the inlet port 301 via the internal flow path 303 connected to the outlet port 302. As a result, deposits blown off by the gas from each of the gas blowing units 200 are sucked together with the air from the inlet port 301.

The suction force of the gas suction unit 300 can be adjusted by changing the length of the inlet port 301 in the height direction. Note that it is desirable that the length of the inlet port 301 in the height direction be shorter than the height of the tablets T. Normally, the suction force for sucking air from the inlet port 301 is not set to the one by which the tablets T are sucked through the inlet port 301. However, if the adjustment of the suction force is insufficient or the type of the tablets T is changed (the tablets T are replaced with those having a different size), there is a concern that the tablets T may be sucked through the inlet port 301. Therefore, by making the length of the inlet port 301 in the height direction shorter than the height of the tablets T, the tablets T can be prevented from being sucked through the inlet port 301. The longitudinal length of the inlet port 301 is appropriately set based on the suction range required to remove deposits adhering to the tablets T on the conveyor belt 21a.

Further, the amount of gas from each of the gas blowing units 200 and the suction force for sucking air from the inlet port 301 are set such that the position of the tablet T (including the position of the tablet T in the X direction, the Y direction, and the e direction, the posture of the tablet T such as its inclination, etc.) does not change on the conveyor belt 21a and the tablet T does not fall from the conveyor belt 21a due to the gas from the gas blowing units 200 and the suction force for sucking air from the inlet port 301.

Blowing of gas from the gas blowing units 200 and suction of air from the gas suction units 300 are always performed during the operation of the tablet printing apparatus 1. Even if the tablets T do not arrive at the gas blowing units 200, the detecting device 22, the first imaging device 23, or the print head device 24 for a certain period of time, gas is blown from the gas blowing units 200 and air is sucked from the gas suction units 300. Thereby, powder adhering to the conveyor belt 21a can be removed, and powder is prevented from adhering to the conveyor belt 21a. If powders of the tablets T have adhered to the conveyor belt 21a, the first imaging device 23 may photograph the powders. This may result in erroneous detection, and printing may be performed on the conveyor belt 21a while there is no tablet T. However, by constantly blowing gas from the gas blowing units 200 and sucking air from the gas suction units 300, such erroneous detection can be prevented.

Besides, when tablets T are newly supplied to the conveyor belt 21a where powders have adhered, the tablets T slide on the conveyor belt 21a and fall from the conveyor belt 21a, or the posture of the tablets T changes on the conveyor belt 21a. If the deposit removing mechanism constantly blows gas and sucks gas during the operation of the tablet printing apparatus 1, sliding of the tablets T on the conveyor belt 21a can be suppressed at the time of restarting the conveyance of the tablets T.

In the configuration as described above, during printing on the tablets T, gas is being blown out from each of the through holes 100a onto the conveyor belt 21a by each of the gas blowing units 200. Further, the air in the chamber main body 61 is being sucked, and accordingly, the air in the space between the upper surface of the conveyor belt 21a and the lower surface of the cover 100 is sucked from the inlet port 301 of each of the gas suction units 300. In this state, gas is blown by the gas blowing units 200 to the tablets T that are passing under the gas blowing units 200 as being conveyed by the conveyor belt 21a. At this time, deposits that have adhered to the tablets T are blown away therefrom and sucked by the gas suction units 300 together with air. In this manner, the deposits adhering to the tablets T are removed. Thus, it is possible to prevent printing on the tablets T to which deposits have adhered, thereby suppressing reduction in print quality.

While gas is blown onto the conveyor belt 21a by the gas blowing units 200, a part of the gas is guided by the guide plates 104 to flow along the lower surface of the cover 100 in the conveying direction A1 of the tablets T. As a result, the gas is blown against deposits adhering to the lower surface of the cover 100. Thereby, the deposits are blown away from the lower surface of the cover 100 and sucked by the gas suction units 300 together with air. In this manner, the deposits adhering to the lower surface of the cover 100, i.e., the translucent member 101, are removed. Thus, erroneous detection and recognition can be suppressed, which suppresses reduction in print quality. Further, since powders of the tablets T flying around the cover 100 can also be sucked and removed, the powders can be prevented from adhering to the tablets T, the lower surface of the cover 100, the conveyor belt 21a, and the like. The longitudinal length, the length along the conveying direction A1, and the inclination angle of the guide plates 104 are each set to a value that can blow off deposits adhering to the translucent member 101 such that the guide plates 104 do not contact the tablets T being conveyed thereunder. The guide plates 104 are not limited to flat plates, and they may be plates having a curved shape as long as deposits adhering to the translucent member 101 can be blown off.

As described above, the guide plates 104 guide a part of the gas to flow along the lower surface of the cover 100. The gas flowing along the lower surface of the cover 100 in the conveying direction A1 of the tablets T is blocked by the shield plates 105, and is sucked from the inlet port 301 of each of the gas suction units 300. At this time, the deposits blown off from the lower surface of the cover 100 are also sucked through the inlet port 301 together with the gas. This prevents the airflow flowing along the lower surface of the cover 100 and the deposits blown off from the lower surface of the cover 100 from adversely affecting the printing of the print head device 24. Thus, reduction in print quality can be suppressed.

Incidentally, the above-described conveyor belt 21a may sometimes vibrate because it rubs against the upper and lower surfaces of the chamber main body 61 while conveying the tablets T. At this time, deposits (for example, powder and dust) adhering to the conveyor belt 21a are likely to be scattered due to the vibration of the conveyor belt 21a. However, the scattering is suppressed by the gas blown from the gas blowing units 200. Even if the deposits are scattered, they are sucked by the gas suction units 300. Thereby, the deposits adhering to the conveyor belt 21a are prevented from adhering to the tablets T on the conveyor belt 21a. Thus, reduction in print quality can be suppressed.

The seventh embodiment can be applied to other embodiments, for example, the fourth and fifth embodiments described above. In these cases, due to the reduced suction force of a part (first compartment) of the chamber 21f, the conveyor belt 21a may vibrate at the portion where the reduced suction force is applied. At this time, deposits adhering to the conveyor belt 21a are likely to be scattered due to the vibration of the conveyor belt 21a. However, the scattering is suppressed by the gas blown from the gas blowing units 200. Even if the deposits are scattered, they are sucked by the gas suction units 300. Thereby, the deposits adhering to the conveyor belt 21a are prevented from adhering to the tablets T on the conveyor belt 21a. Thus, reduction in print quality can be suppressed.

(First and Second Modifications of the Gas Suction Units)

Figure 17:
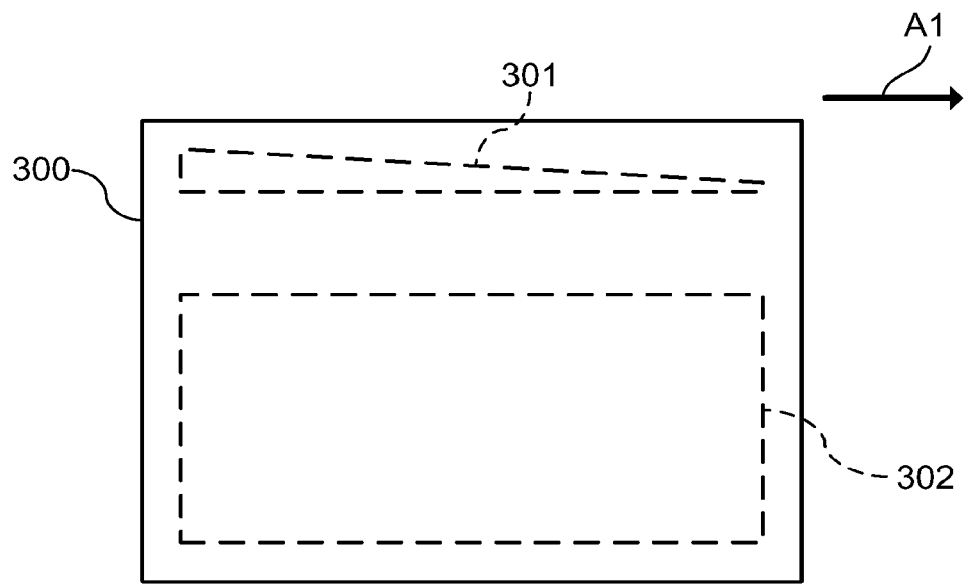
FIG. 17 is diagram illustrating a gas suction unit according to a first modification of the seventh embodiment.
Figure 18:
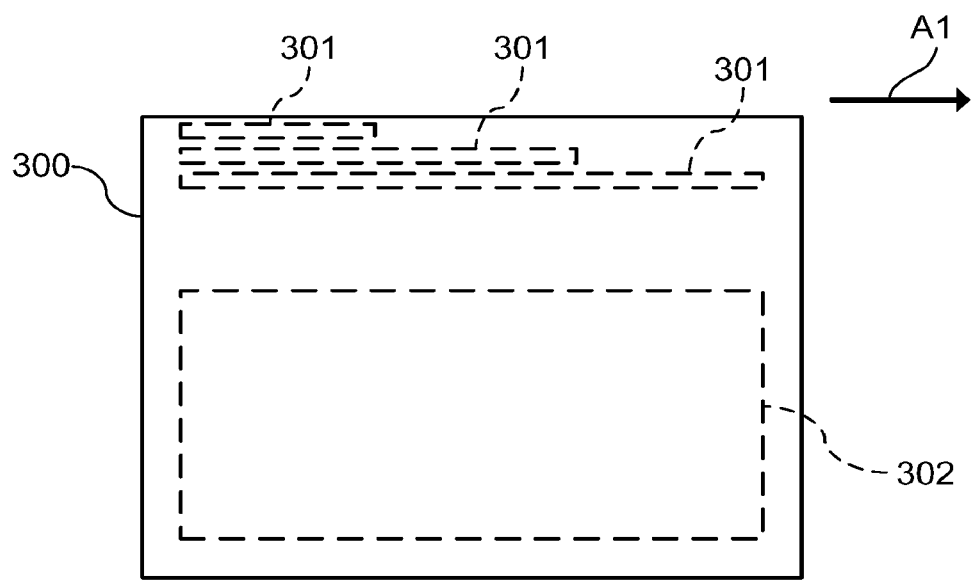
FIG. 18 is diagram illustrating a gas suction unit according to a second modification of the seventh embodiment.

In the above example, the inlet port 301 of each of the gas suction units 300 is described as being formed in a rectangular shape extending in the conveying direction A1 of the tablets T; however, it is not so limited. For example, as illustrated in FIG. 17, the inlet port 301 may be formed in a triangular shape that gradually narrows along the conveying direction A1 of the tablets T (first modification). Alternatively, as illustrated in FIG. 18, a plurality of rectangular inlet ports 301 having different elongated lengths may be arranged in the height direction with their left ends aligned (second modification). In these cases, the suction force gradually decreases along the conveying direction A1 of the tablets T, i.e., toward the print head device 24 side (right side in FIGS. 17 and 18) in each of the gas suction units 300. Therefore, an airflow generated by the suction of the gas suction units 300 can be prevented from adversely affecting the printing of the print head device 24. Thus, reduction in print quality can be more reliably suppressed. Incidentally, the gas from the gas blowing units 200 is not supplied directly but supplied via the guide plates 104 around the inlet ports 301 of the gas suction units 300 on the downstream side in the conveying direction A1. Therefore, there is no problem even if the amount of air sucked through the inlet ports 301 decreases.

In the example of FIG. 17, the upper side of the triangular inlet port 301 is inclined; however, the lower side or both sides may be inclined. Besides, in the example of FIG. 18, a plurality of inlet ports 301 are arranged in ascending order of their length from the top; however, they may be arranged in ascending order of their length from the bottom, or may be arranged irrespective of their lengths. Circular or elliptical inlet ports 301 may be arranged in one row or a plurality of rows along the conveying direction A1 of the tablets T.

(Third Modification of the Gas Suction Units)

Figure 19:
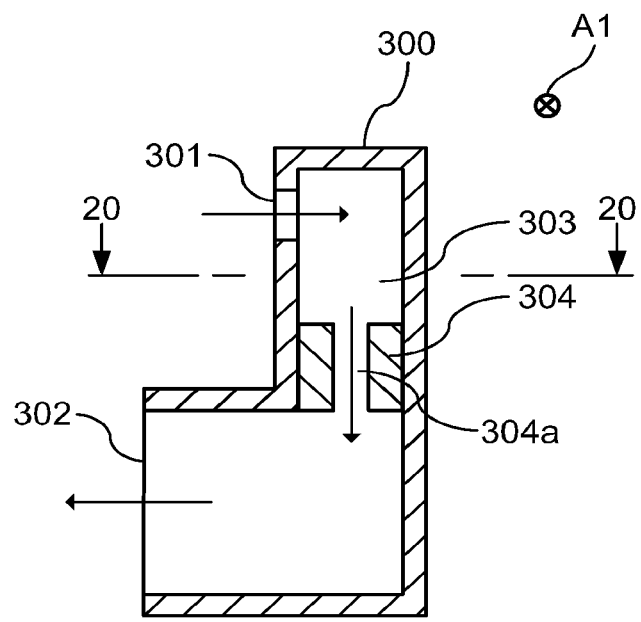
FIG. 19 is diagram illustrating a gas suction unit according to a third modification of the seventh embodiment.
Figure 20:
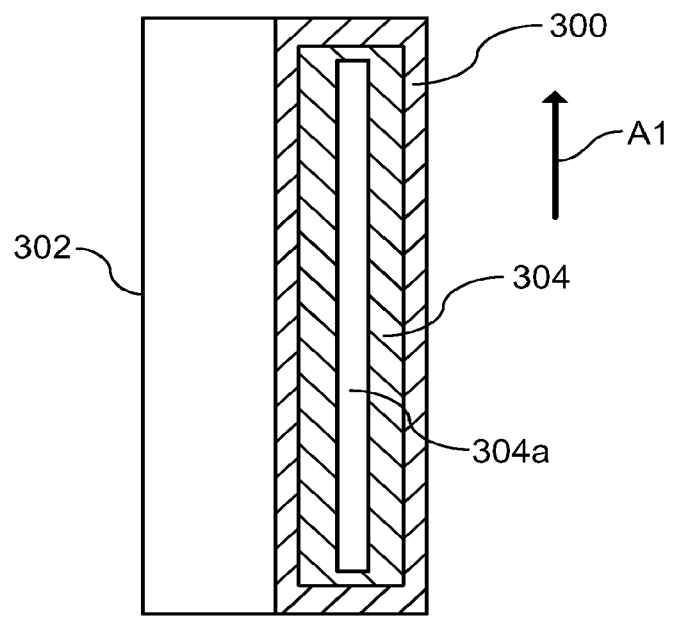
FIG. 20 is a cross-sectional view taken along line 20-20 of FIG. 19.

In the above example, the suction force of each of the gas suction units 300 is described as adjustable by changing the length of the inlet port 301 thereof in the height direction; however, it is not so limited. For example, as illustrated in FIG. 19, the gas suction units 300 may be each provided with a suction force adjusting member 304 in the internal flow path 303 thereof. As illustrated in FIG. 20, the suction force adjusting member 304 has a rectangular (slit-shaped) through hole 304a extending in the conveying direction A1 of the tablets T. The suction force adjusting member 304 is located inside the internal flow path 303 so as to close it, and adjusts the suction force by changing the flow rate of the gas passing through the internal flow path 303. The suction force of each of the gas suction units 300 can be easily adjusted by preparing several types of suction force adjusting members 304 each having a through hole 304a with a different slit width (width of the through hole in a direction perpendicular to the conveying direction A1 of the tablets T in the horizontal plane) and selecting one of them for use depending on the required suction force.

In the example of FIG. 19, the through hole 304a of the suction force adjusting member 304 is formed in a rectangular shape extending in the conveying direction A1 of the tablets T; however, it is not so limited. The through hole 304a may be formed in various shapes such as a circular shape, an elliptical shape, a triangular shape, or the like. Besides, the number of through holes 304a is also not limited, and there may be a plurality of through holes. For example, a plurality of through holes 304a having a circular shape, an elliptical shape, or the like may be formed to be aligned in one or a plurality of rows (for example, two or three rows) in the conveying direction A1 of the tablets T. The through holes may also be formed irregularly (randomly).

The suction force adjusting member 304 having the through hole 304a may be detachable so that it can be replaced when the type of the tablets T to be printed is changed. In this manner, even if the object to be printed is changed, the suction force can be easily adjusted. The suction force adjusting member 304 may be attached anywhere in each of the gas suction units 300, and may be attached to the inlet port 301 or the outlet port 302.

(Modification of the Cover)

Figure 21:
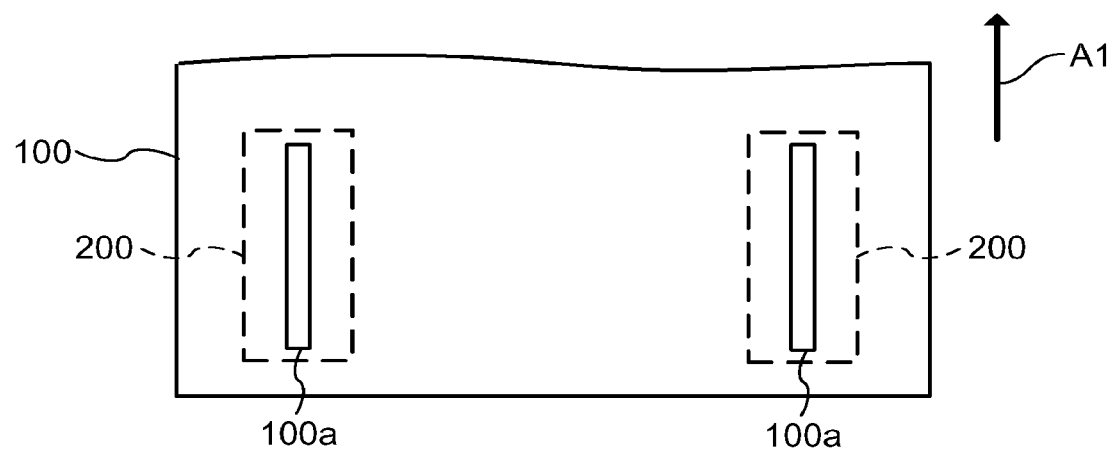
FIG. 21 is diagram illustrating a cover according to a modification of the seventh embodiment.

In the above example, the through holes 100a of the cover 100 are described as being arranged in a row in the conveying direction A1 of the tablets T; however, it is not so limited. The through holes 100a may be arranged in two or more rows, or they need not necessarily be arranged in rows and may be randomly formed. Further, as illustrated in FIG. 21 (a plan view of the lower surface of the cover 100), the through holes 100a may be formed in a slit shape.

In the above example, the detecting device 22, the first imaging device 23, the print head device 24, and the second imaging device 25 are described as being housed in the cover 100; however, it is not so limited. Because of the cover 100, powder does not adhere to the detecting device 22, the first imaging device 23, the print head device 24, and the second imaging device 25, and only the cover 100 can be detached and cleaned. This is efficient when there is a change in the type of tablets T. However, the cover 100 may be eliminated as long as the deposit removing mechanism functions sufficiently. In this case, the guide plates 104 are attached to the gas blowing units 200. If the cover 100 is not present as described above, the height position of each of the detecting device 22, the first imaging device 23, the print head device 24, and the second imaging device 25 can be freely changed.

OTHER EMBODIMENTS

In the above embodiments, the pulley bodies 21*b*, 80, and 90 are described as being provided with a drive source; however, it is not so limited. The pulley bodies 21*b*, 80, and 90 may be driven.

In the above embodiments, the first rotator and the second rotators are described as timing pulleys; however, this is by way of example and not limitation. Sprockets or the like may be used as the rotators.

In the above embodiments, the tablets T are described above as being conveyed in two rows; however, this is by way of example and the number of rows is not particularly limited. There may be one row, three rows, or four or more rows.

In the above embodiments, there is provided only one conveyor belt 21*a*; however, this is by way of example and the number of conveyor belts is not particularly limited. There may be provided two or more conveyor belts. For example, a plurality of conveyor belts 21*a* may be arranged in parallel.

In the above embodiments, the suction holes 21*g* of the conveyor belt 21*a* are described as being circular; however, this is by way of example and the shape of the suction holes 21*g* is not particularly limited. The suction holes may be in a rectangular shape, an elliptical shape, or a slit-like shape.

In the above embodiments, the print heads 24*a* are described as each being provided for each conveying path of the tablet T; however, this is by way of example and not limitation. For example, one print head 24*a* may perform printing on two or more rows of tablets T.

In the above embodiments, the print heads 24*a* are described as inkjet print heads each having an array of the nozzles 24*b*; however, this is by way of example and not limitation. For example, the print heads 24*a* may be provided with a plurality of arrays of the nozzles 24*b*. Further, the print heads 24*a* may be arranged along the conveying direction A1 of the tablets T. Besides, the type of printing need not necessarily be inkjet printing, and laser marking printing or transfer drum printing can also be used.

In the above embodiments, the first printing device 20 and the second printing device 30 are described as being arranged one on top of the other to perform printing on either one or both sides of the tablet T; however, this is by way of example and not limitation. For example, only the first printing device 20 may be provided to perform printing only on one side of the tablet T.

In the above embodiments, the gas blower 42*a* is described as being provided to the non-defective product collecting device 42; however, this is by way of example and not limitation. For example, the gas blower 42*a* may be arranged at the end of the conveying device 21 on the conveying device 31 side or in a place where the tablets T are transferred from the transfer feeder 13 to the conveying device 21. In other words, the gas blower 42*a* may be used at a place where the tablets T are desired to be taken off from the conveyor belt 21*a*.

In the above embodiments, the gas blower 42*a* is described as always blowing out gas during the process; however, this is by way of example and not limitation. The gas blower 42*a* may blow out gas intermittently.

The above-described tablets may include tablets for pharmaceutical use, edible use, cleaning, industrial use, and aromatic use. Examples of the tablets include plain tablets (uncoated tablets), sugar-coated tablets, film-coated tablets, enteric coated tablets, gelatin coated tablets, multilayered tablets, dry-coated tablets, and the like. Examples of the tablets further include various capsule tablets such as hard capsules and soft capsules. The tablets may be in a variety of shapes such as, for example, a disk shape, a lens shape, a triangle shape, an oval shape, and the like. In the case where tablets to be printed are for pharmaceutical use or edible use, edible ink is suitably used. As the edible ink, any of synthetic dye ink, natural color ink, dye ink, and pigment ink may be used.

While certain embodiments have been described, these embodiments have been presented by way of example only, and are not intended to limit the scope of the inventions. Indeed, the novel embodiments described herein may be embodied in a variety of other forms; further, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A tablet printing apparatus, comprising:
a first rotator having an inner space;
a chamber configured to communicate with the inner space of the first rotator;
a suction pipe configured to suck inside the chamber;
a second rotator arranged to face the first rotator across the chamber;
a conveyor belt wrapped around the first rotator and the second rotator; and
a print head configured to perform printing on a tablet that is held on the conveyor belt, wherein
the first rotator is provided with a through hole extending in a rotation direction of the first rotator,
the chamber is configured to communicate with the inner space of the first rotator through the through hole,
the conveyor belt includes a plurality of suction holes which communicate with the inner space of the first rotator and an inner space of the chamber, and are arranged in the rotation direction of the first rotator, and
the first rotator and the chamber constitutes a suction chamber that applies a suction force to those of the suction holes of the conveyor belt that are located around an outer periphery of the first rotator and an outer periphery of the chamber.

2. The tablet printing apparatus according to claim 1, wherein the chamber is configured to communicate with the inner space of the first rotator from a surface of the first rotator that extends in the rotation direction of the first rotator.

3. The tablet printing apparatus according to claim 2, further comprising a suction force adjuster configured to reduce the suction force in a first area of the conveyor belt including at least an area under the print head compared to a second area of the conveyor belt other than the first area.

4. The tablet printing apparatus according to claim 2, wherein
the first rotator includes:
a rotating shaft; and
a pair of conveyor pulleys that are provided to the rotating shaft so as to face each other while being spaced apart in a direction in which the rotating shaft extends, the conveyor belt being wrapped around the conveyor pulleys, and wherein the chamber is configured to communicate with the inner space between the conveyor pulleys of the first rotator.

5. The tablet printing apparatus according to claim 2, wherein the first rotator includes:
- a rotating shaft;
- a pair of conveyor pulleys that are provided to the rotating shaft so as to face each other while being spaced apart in a direction in which the rotating shaft extends, the conveyor belt being wrapped around the conveyor pulleys; and
- a pair of guide pulleys that are provided to the rotating shaft so as to face each other while being spaced apart in a direction in which the rotating shaft extends, the guide pulleys configured to rotate together with the conveyor pulleys in contact with the conveyor belt, and wherein the chamber is configured to communicate with the inner space between the guide pulleys of the first rotator.

6. The tablet printing apparatus according to claim 2, wherein the first rotator includes:
- a rotating shaft;
- a pair of conveyor pulleys that are provided to the rotating shaft so as to face each other while being spaced apart in a direction in which the rotating shaft extends, the conveyor belt being wrapped around the conveyor pulleys; and
- a guide pulley having a plurality of through holes and provided to the rotating shaft, the guide pulley configured to rotate together with the conveyor pulleys in contact with the conveyor belt, and wherein the chamber is configured to communicate with the inner space of the first rotator through the through holes.

7. The tablet printing apparatus according to claim 2, wherein distance between the first rotator and the chamber is smaller than a thickness of the tablet.

8. The tablet printing apparatus according to claim 1, further comprising a suction force adjuster configured to reduce the suction force in a first area of the conveyor belt including at least an area under the print head compared to a second area of the conveyor belt other than the first area.

9. The tablet printing apparatus according to claim 8, wherein the first rotator includes:
- a rotating shaft; and
- a pair of conveyor pulleys that are provided to the rotating shaft so as to face each other while being spaced apart in a direction in which the rotating shaft extends, the conveyor belt being wrapped around the conveyor pulleys, and wherein the chamber is configured to communicate with the inner space between the conveyor pulleys of the first rotator.

10. The tablet printing apparatus according to claim 8, wherein the first rotator includes:
- a rotating shaft;
- a pair of conveyor pulleys that are provided to the rotating shaft so as to face each other while being spaced apart in a direction in which the rotating shaft extends, the conveyor belt being wrapped around the conveyor pulleys; and
- a pair of guide pulleys that are provided to the rotating shaft so as to face each other while being spaced apart in a direction in which the rotating shaft extends, the guide pulleys configured to rotate together with the conveyor pulleys in contact with the conveyor belt, and wherein the chamber is configured to communicate with the inner space between the guide pulleys of the first rotator.

11. The tablet printing apparatus according to claim 8, wherein the first rotator includes:
- a rotating shaft;
- a pair of conveyor pulleys that are provided to the rotating shaft so as to face each other while being spaced apart in a direction in which the rotating shaft extends, the conveyor belt being wrapped around the conveyor pulleys; and
- a guide pulley having a plurality of through holes and provided to the rotating shaft, the guide pulley configured to rotate together with the conveyor pulleys in contact with the conveyor belt, and wherein the chamber is configured to communicate with the inner space of the first rotator through the through holes.

12. The tablet printing apparatus according to claim 8, wherein the suction force adjuster is a suction force lowering member located in the suction chamber at a position corresponding to the first area.

13. The tablet printing apparatus according to claim 8, wherein a plurality of through holes, which communicate with the inner space of the chamber, are formed on the chamber to be arranged in conveying direction of the tablet, and the suction force adjuster is configured to adjust the suction force by reducing size of the through holes in a position corresponding to the first area smaller than in other positions.

14. The tablet printing apparatus according to claim 1, wherein the first rotator includes:
- a rotating shaft; and
- a pair of conveyor pulleys that are provided to the rotating shaft so as to face each other while being spaced apart in a direction in which the rotating shaft extends, the conveyor belt being wrapped around the conveyor pulleys, and wherein the chamber is configured to communicate with the inner space between the conveyor pulleys of the first rotator.

15. The tablet printing apparatus according to claim 1, wherein the first rotator includes:
- a rotating shaft;
- a pair of conveyor pulleys that are provided to the rotating shaft so as to face each other while being spaced apart in a direction in which the rotating shaft extends, the conveyor belt being wrapped around the conveyor pulleys; and
- a pair of guide pulleys that are provided to the rotating shaft so as to face each other while being spaced apart in a direction in which the rotating shaft extends, the guide pulleys configured to rotate together with the conveyor pulleys in contact with the conveyor belt, and wherein the chamber is configured to communicate with the inner space between the guide pulleys of the first rotator.

16. The tablet printing apparatus according to claim 1, wherein the first rotator includes:
   a rotating shaft;
   a pair of conveyor pulleys that are provided to the rotating shaft so as to face each other while being spaced apart in a direction in which the rotating shaft extends, the conveyor belt being wrapped around the conveyor pulleys; and
   a guide pulley having a plurality of through holes and provided to the rotating shaft, the guide pulley configured to rotate together with the conveyor pulleys in contact with the conveyor belt, and wherein the chamber is configured to communicate with the inner space of the first rotator through the through holes.

17. The tablet printing apparatus according to claim 1, wherein distance between the first rotator and the chamber is smaller than a thickness of the tablet.

18. The tablet printing apparatus according to claim 1, further comprising:
   a supplier configured to supply the tablet onto the conveyor belt;
   an imager located downstream of the supplier in a conveying direction of the tablet, and configured to photograph the tablet;
   a gas blower located downstream of the supplier and upstream of the imager in the conveying direction of the tablet, and configured to blow gas toward the conveyor belt; and
   a gas suction member configured to suck the gas from the gas blower, wherein
   the gas suction member includes an inlet port and an outlet port,
   the inlet port is an opening arranged along the conveying direction of the tablet, and is located upstream of the print head in the conveying direction of the tablet, and
   the outlet port is connected to the chamber.

19. The tablet printing apparatus according to claim 1, further comprising a suction force adjuster, wherein
   the suction chamber is divided into a plurality of compartments, and
   the suction force adjuster is configured to adjust the suction force with respect to each of the compartments.

* * * * *